(12) United States Patent
Nakao

(10) Patent No.: US 9,645,906 B2
(45) Date of Patent: May 9, 2017

(54) ELECTRONIC APPARATUS DETECTING A PLURALITY OF DEVICES USING A PLURALITY OF PROCESSORS AND METHOD OF DETECTING A PLURALITY OF DEVICES USING A PLURALITY OF PROCESSORS

(71) Applicant: FUJITSU LIMITED, Kawasaki-shi, Kanagawa (JP)

(72) Inventor: Manabu Nakao, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 85 days.

(21) Appl. No.: 14/736,453

(22) Filed: Jun. 11, 2015

(65) Prior Publication Data

US 2016/0026550 A1 Jan. 28, 2016

(30) Foreign Application Priority Data

Jul. 24, 2014 (JP) .................. 2014-151210

(51) Int. Cl.
*G06F 1/00* (2006.01)
*G06F 11/30* (2006.01)
(Continued)

(52) U.S. Cl.
CPC .......... *G06F 11/3051* (2013.01); *G06F 1/324* (2013.01); *G06F 1/3243* (2013.01); *G06F 1/3275* (2013.01); *G06F 1/3293* (2013.01); *G06F 1/3296* (2013.01); *G06F 3/0604* (2013.01); *G06F 3/064* (2013.01); *G06F 3/0629* (2013.01); *G06F 3/0652* (2013.01);
(Continued)

(58) Field of Classification Search
CPC .. G06F 11/3051; G06F 1/3243; G06F 1/3275; G06F 1/3293; G06F 1/3296; G06F 3/064
USPC .......................................... 713/323
See application file for complete search history.

(56) References Cited

U.S. PATENT DOCUMENTS

2008/0168466 A1* 7/2008 Nitta ................. G06F 9/5027
718/105
2008/0281992 A1* 11/2008 Hsu ................... G06F 13/37
710/4

(Continued)

FOREIGN PATENT DOCUMENTS

| JP | 8-6798 | 1/1996 |
|---|---|---|
| JP | 2006-259927 | 9/2006 |
| JP | 2013-131940 | 7/2013 |

*Primary Examiner* — Robert Cassity
(74) *Attorney, Agent, or Firm* — Staas & Halsey LLP

(57) ABSTRACT

An apparatus includes a memory, a first processor, and a second processor, wherein the first processor is configured to retain first order data that indicate a first order of the plurality of devices, generate second order data that indicate a second order which is a portion of a first order, and decrease power consumption of the first processor after generate the second order data, the memory is configured to retain the second order data, the second processor is configured to detect a plurality of devices, determine whether or not a detection order of the plurality of devices corresponds with the second order, and output a correspondence signal in a case where the detection order corresponds with the second order, and the first processor is configured to increase the power consumption of the first processor based on the correspondence signal.

18 Claims, 22 Drawing Sheets

(51) Int. Cl.
*G06F 1/32* (2006.01)
*G06F 3/06* (2006.01)

(52) U.S. Cl.
CPC ........ *G06F 3/0673* (2013.01); *G06F 11/3024* (2013.01); *Y02B 60/1228* (2013.01); *Y02B 60/1235* (2013.01); *Y02B 60/165* (2013.01)

(56) References Cited

U.S. PATENT DOCUMENTS

| | | | | |
|---|---|---|---|---|
| 2010/0022246 A1* | 1/2010 | Miki | .................. | H04W 36/24 |
| | | | | 455/436 |
| 2011/0066911 A1* | 3/2011 | Yoshimoto | ........... | H04J 11/0023 |
| | | | | 714/748 |
| 2013/0165181 A1* | 6/2013 | Hasegawa | ............... | G06F 1/324 |
| | | | | 455/556.1 |
| 2015/0261270 A1* | 9/2015 | Vikinski | .................. | G06F 1/26 |
| | | | | 713/300 |

* cited by examiner

FIG. 5

| | SOURCE STATE OF TRANSITION | CONDITION OF STATE TRANSITION | DESTINATION STATE OF TRANSITION | PROCESS | DATA AMOUNT |
|---|---|---|---|---|---|
| ORDER DATA (200 BYTES) — FIRST CONDITION DATA | STATE 0 | DETECTION OF DEVICE A | STATE 1 | — | 50 BYTES |
| SECOND CONDITION DATA | STATE 1 | DETECTION OF DEVICE B | STATE 2 | — | 50 BYTES |
| THIRD CONDITION DATA | STATE 2 | DETECTION OF DEVICE C | STATE 3 | — | 50 BYTES |
| FOURTH CONDITION DATA | STATE 3 | DETECTION OF DEVICE D | — | DELIVERY REQUEST TO SERVER | 50 BYTES |

FIG. 13A

| | SOURCE STATE OF TRANSITION | CONDITION OF STATE TRANSITION | DESTINATION STATE OF TRANSITION | PROCESS | DATA AMOUNT |
|---|---|---|---|---|---|
| FIRST CONDITION DATA | STATE 0 | DETECTION OF DEVICE A | STATE 1 | — | 50 BYTES |

FIG. 13B

| | SOURCE STATE OF TRANSITION | CONDITION OF STATE TRANSITION | DESTINATION STATE OF TRANSITION | PROCESS | DATA AMOUNT |
|---|---|---|---|---|---|
| FIRST CONDITION DATA | STATE 0 | DETECTION OF DEVICE A | STATE 1 | — | 50 BYTES |
| SECOND CONDITION DATA | STATE 1 | DETECTION OF DEVICE B | STATE 2 | — | 50 BYTES |

TOTAL: 100 BYTES

FIG. 13C

| | SOURCE STATE OF TRANSITION | CONDITION OF STATE TRANSITION | DESTINATION STATE OF TRANSITION | PROCESS | DATA AMOUNT |
|---|---|---|---|---|---|
| FIRST CONDITION DATA | STATE 0 | DETECTION OF DEVICE A | STATE 1 | — | 50 BYTES |
| SECOND CONDITION DATA | STATE 1 | DETECTION OF DEVICE B | — | NOTIFY TO CPU | 50 BYTES |

TOTAL: 100 BYTES

FIG. 17

| | | SOURCE STATE OF TRANSITION | CONDITION OF STATE TRANSITION | DESTINATION STATE OF TRANSITION | PROCESS | TRANSITION PROBABILITY | DATA AMOUNT |
|---|---|---|---|---|---|---|---|
| ORDER DATA (400 BYTES) | FIRST CONDITION DATA | STATE 0 | DETECTION OF DEVICE A | STATE 1 | — | 0.8 | 100 BYTES |
| | SECOND CONDITION DATA | | DETECTION OF DEVICE E | STATE 4 | — | 0.2 | |
| | THIRD CONDITION DATA | STATE 1 | DETECTION OF DEVICE B | STATE 2 | — | — | 50 BYTES |
| | FOURTH CONDITION DATA | STATE 2 | DETECTION OF DEVICE C | STATE 3 | — | — | 50 BYTES |
| | FIFTH CONDITION DATA | STATE 3 | DETECTION OF DEVICE D | — | DELIVERY REQUEST TO SERVER | — | 50 BYTES |
| | SIXTH CONDITION DATA | STATE 4 | DETECTION OF DEVICE F | STATE 5 | — | — | 50 BYTES |
| | SEVENTH CONDITION DATA | STATE 5 | DETECTION OF DEVICE G | STATE 6 | — | — | 50 BYTES |
| | | STATE 6 | DETECTION OF DEVICE H | — | DELIVERY REQUEST TO SERVER | — | 50 BYTES |

FIG. 21A

| FIRST CONDITION DATA | SOURCE STATE OF TRANSITION | CONDITION OF STATE TRANSITION | DESTINATION STATE OF TRANSITION | PROCESS | TRANSITION PROBABILITY | DATA AMOUNT |
|---|---|---|---|---|---|---|
| | STATE 0 | DETECTION OF DEVICE A | STATE 1 | — | 0.8 | 100 BYTES |
| | | DETECTION OF DEVICE E | STATE 4 | — | 0.2 | |

FIG. 21B

| | SOURCE STATE OF TRANSITION | CONDITION OF STATE TRANSITION | DESTINATION STATE OF TRANSITION | PROCESS | TRANSITION PROBABILITY | DATA AMOUNT |
|---|---|---|---|---|---|---|
| FIRST CONDITION DATA | STATE 0 | DETECTION OF DEVICE A | STATE 1 | — | 0.8 | 100 BYTES |
| | | DETECTION OF DEVICE E | STATE 4 | — | 0.2 | |
| SECOND CONDITION DATA | STATE 1 | DETECTION OF DEVICE B | STATE 2 | — | — | 50 BYTES |

FIG. 21C

| | SOURCE STATE OF TRANSITION | CONDITION OF STATE TRANSITION | DESTINATION STATE OF TRANSITION | PROCESS | TRANSITION PROBABILITY | DATA AMOUNT |
|---|---|---|---|---|---|---|
| FIRST CONDITION DATA | STATE 0 | DETECTION OF DEVICE A | STATE 1 | — | 0.8 | 100 BYTES |
| | | DETECTION OF DEVICE E | — | NOTIFY TO CPU | 0.2 | |
| SECOND CONDITION DATA | STATE 1 | DETECTION OF DEVICE B | — | NOTIFY TO CPU | — | 50 BYTES |

ELECTRONIC APPARATUS DETECTING A PLURALITY OF DEVICES USING A PLURALITY OF PROCESSORS AND METHOD OF DETECTING A PLURALITY OF DEVICES USING A PLURALITY OF PROCESSORS

CROSS-REFERENCE TO RELATED APPLICATION

This application is based upon and claims the benefit of priority of the prior Japanese Patent Application No. 2014-151210, filed on Jul. 24, 2014, the entire contents of which are incorporated herein by reference.

FIELD

The embodiments discussed herein are related to an electronic apparatus and a device detection method.

BACKGROUND

A technology has been developed in which a radio device for near field communication (NFC), a radio device for Bluetooth®, or the like, which is installed in a portable terminal apparatus such as a smart phone, is used to receive a signal from an NFC tag, a Bluetooth beacon, or the like. A portable terminal apparatus is capable of recognizing that a specific NFC tag or Bluetooth beacon is in the vicinity of the portable terminal apparatus by the received signal. Hereinafter, the NFC tag, the Bluetooth beacon, and so forth will be referred to as "device", and the radio device for NFC, the radio device for Bluetooth, and so forth, which are installed in the portable terminal apparatus, will be referred to as "sensor (device detection apparatus)". The portable terminal apparatus executes specific processes based on sensing results of the sensor, notifies a server of the circumstance of the portable terminal apparatus, and receives information or application software (hereinafter referred to as "application") that is suitable for the circumstance. For example, when a user who retains the portable terminal apparatus visits a certain event site, the sensor of the portable terminal apparatus detects the devices such as the NFC tag and the Bluetooth beacon that are provided in the site, and the portable terminal apparatus thereby senses that the user visits the event site. Then, the sensing result is transmitted from the portable terminal apparatus to the server, and the server delivers guide information or the like about the event site, for example, to the portable terminal apparatus.

Meanwhile, in order to reduce power consumption of the portable terminal apparatus having such a sensor, a technology has been developed in which the operation mode of a central processing unit (CPU) of the portable terminal apparatus turns into a quiescent mode in a case where the CPU is not performing data processing and turns into an active mode in a case where a device detection signal from the sensor is received, for example. This reduces the power consumption of the CPU and thus increases an operable time of the portable terminal apparatus by battery driving.

Here, the CPU may execute a prescribed process in a case where the detection order of plural devices to be detected by the sensor corresponds to a specific order. This may be a case where the server delivers specific information to the portable terminal apparatus only when the user having the portable terminal apparatus goes around plural booths provided in a certain event site following a prescribed usual route. For example, the prescribed usual route about booths A and B provided in the event site defines that the user first goes to the booth A and thereafter the booth B. In this case, the sensor detects a device A such as the NFC tag or the Bluetooth beacon that is provided in the booth A on a visit of the booth A by the user and notifies the CPU of the device detection signal. In a case where the CPU is in the quiescent mode at this point, the CPU turns into the active mode based on the device detection signal. The CPU then records that the CPU detects the device A based on the received device detection signal. The CPU turns into the quiescent mode in a case where there is no other data processing to be executed. Next, the sensor detects a device B that is provided in the booth B on a visit of the booth B by the user and notifies the CPU of the device detection signal. In a case where the CPU is in the quiescent mode at this point, the CPU turns into the active mode based on a reception of the device detection signal. The CPU then determines that the user visits the booth A and the booth B following the prescribed usual route based on the fact that the device detection signal received at the present time is the signal that indicates the device B and the device detection signal that indicates the device A is already received and demands the server to deliver the specific information.

In such a process, the CPU of the portable terminal apparatus turns from the quiescent mode into the active mode when the device A is detected despite the fact that the CPU executes the prescribed process for the first time in a case where the device B is further detected after the device A is detected. Thus, the power consumption of the CPU may not sufficiently be reduced.

Accordingly, a technology has been suggested in which a processor separate from the CPU, for example, a microcontrol unit (MCU), is provided in the portable terminal apparatus, the MCU is caused to perform an order determination of plural device detection signals, and in a case where the MCU makes a determination that the plural device detection signals are issued in a prescribed order, the MCU notifies the CPU of the determination. By using this method, the CPU does not have to turn into the active mode at each time when plural device detection signals are generated from the sensor, and the period in which the CPU maintains the quiescent mode may be extended. Further, in a case where the power consumption of the MCU is lower than the power consumption of the CPU, the power consumption of the portable terminal apparatus as a whole may be reduced. An example of a document of related art is Japanese Laid-open Patent Publication No. 2013-131940.

SUMMARY

According to an aspect of the invention, an apparatus includes a memory, a first processor, and a second processor, wherein the first processor is configured to retain first order data that indicate a first order of the plurality of devices, generate second order data that indicate a second order of the plurality of devices which is a portion of a first order, includes a first stage of the first order, and does not include a final stage of the first order, and decrease power consumption of the first processor after generate the second order data, the memory is configured to retain the second order data, the second processor is configured to detect a plurality of devices, determine whether or not a detection order of the plurality of devices corresponds with the second order that is retained in the memory, and output a correspondence signal in a case where the detection order corresponds with the second order, and the first processor is configured to increase the power consumption of the first processor based on the correspondence signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram that exemplifies contents of order data in the first embodiment;

FIGS. 13A, 13B, and 13C are diagrams that explain an extraction method of condition data in the first embodiment;

FIG. 17 is a diagram that exemplifies contents of order data in the second embodiment;

FIGS. 21A, 21B, and 21C are diagrams that explain an extraction method of condition data in the second embodiment.

DESCRIPTION OF EMBODIMENTS

Figure 1:
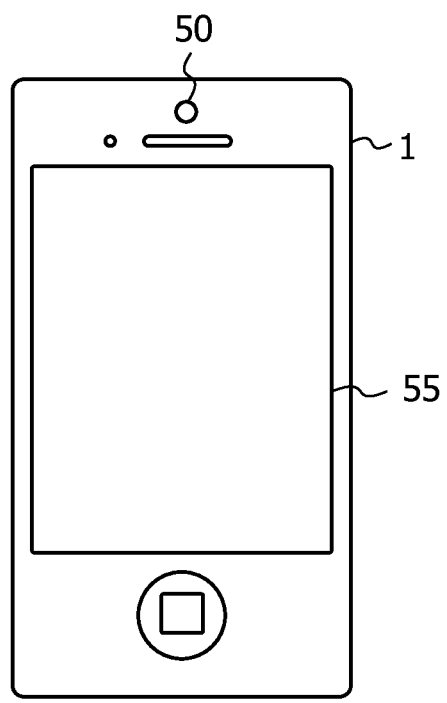
FIG. 1 is a diagram that illustrates a configuration example of an electronic apparatus.

In a case where a processor other than a CPU is caused to execute a determination whether or not plural devices are detected in a predetermined and prescribed order, the other processor has to be notified of the prescribed order and caused to store the order data. However, in a case where the available capacity of a memory that the other processor uses to store the order data is smaller than the data amount of the order data, the other processor may not store the order data in the memory. Embodiments disclosed below allow the order data to be split and stored in a data retaining unit even in a case where the available capacity of the memory that the other processor uses to store the order data is smaller than the data amount of the order data provided by the CPU.

<First Embodiment>

In this embodiment, in an electronic apparatus such as a portable terminal apparatus that has a first processor, a second processor, and a sensor, the sensor detects a device such as an NFC tag or a Bluetooth beacon and generates a device detection signal. The second processor determines whether or not the occurrence order of plural device detection signals corresponds with a predetermined order. The second processor has a data retaining unit. When the first processor notifies the second processor of order data that indicate a prescribed order prior to device detection by the sensor, the second processor causes the data retaining unit to retain the order data. When the first processor notifies the second processor of the order data, the first processor determines whether or not all of the order data may be stored in the data retaining unit based on the data amount of the order data and the available capacity of the data retaining unit. The order data are data that indicate a detection order of plural devices to be detected by the sensor and has a data structure in which plural condition data that provide the device to be next detected when a certain device is detected are sequentially arranged. In a case where the data retaining unit is not capable of storing all of the plural condition data that are contained in the order data, the first processor extracts a portion of the plural condition data contained in the order data and notifies the second processor of the portion. The first processor may turn into the quiescent mode after extracting the portion of the condition data and notifying the second processor of the portion. The second processor performs an order determination about the plural device detection signals based on the condition data that are received from the first processor and retained in the data retaining unit. The second processor performs a determination based on the order that is provided by the condition data retained in the data retaining unit and performs a notification to the first processor in a case where the notification to the first processor is desired. In a case where the undetermined condition data remain in the order data, the first processor, which receives the notification from the second processor, extracts all or a portion of the undetermined condition data, depending on the available capacity of the data retaining unit, and further notifies the second processor of the extracted condition data. Subsequently, the same action is repeated, and the second processor may thereby be caused to execute the order determination of the device detection based on the extracted condition data that are a portion of the order data even in a case where all of the order data may not be retained by the data retaining unit. Accordingly, a period in which the first processor may maintain the quiescent mode may be secured, and the power consumption of the first processor may thereby be reduced.

FIG. 1 is a diagram that illustrates a portable terminal apparatus such as a smart phone as an example of the electronic apparatus that is used in this embodiment. As a main configuration of an electronic apparatus 1, the electronic apparatus 1 has a sound output unit 50 and a display unit 55. The sound output unit 50 is a speaker, for example. The display unit 55 is a display, for example. As the electronic apparatus 1, a portable terminal apparatus other than a smart phone, a personal computer (PC) of a tablet type, a personal digital assistant (PDA), or the like may be used.

Figure 2:
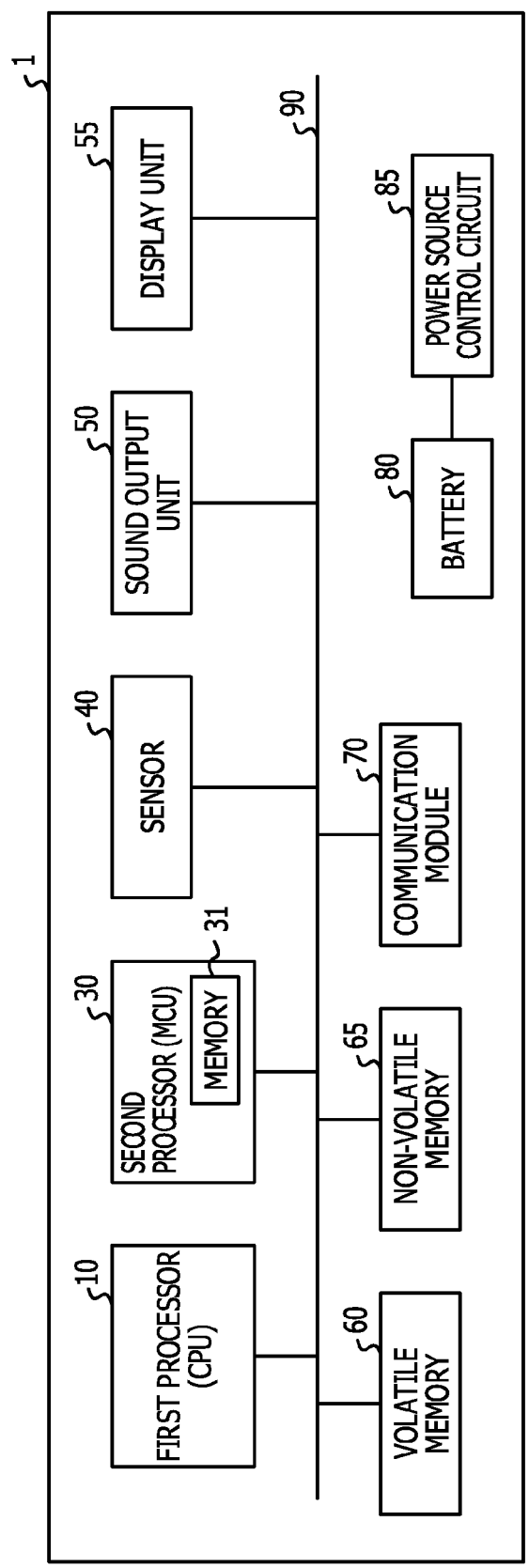
FIG. 2 is a hardware configuration diagram of an electronic apparatus in a first embodiment.

FIG. 2 is a hardware configuration diagram of the electronic apparatus 1. The electronic apparatus 1 has a first processor 10, a second processor 30, a sensor 40, a volatile memory 60, a non-volatile memory 65, a communication module 70, a battery 80, a power source control circuit 85, a bus 90, and the sound output unit 50 and the display unit 55, which are illustrated in FIG. 1. The first processor 10 performs control of the whole electronic apparatus 1, data processing, and so forth. Further, the first processor 10 provides instructions on the order determination of the device detection to the second processor 30. The first processor 10 is an electronic circuit component such as a central processing unit (CPU), a micro-control unit (MCU), a micro processing unit (MPU), a digital signal processor (DSP), or a field programmable gate array (FPGA). The second processor 30 performs the order determination about the plural device detection signals that are received from the sensor 40 and performs a notification to the first processor 10 in a case where the second processor 30 receives the plural device detection signals in a prescribed order. The second processor 30 is an electronic circuit component such as the CPU, the MPU, the MCU, the DSP, or the FPGA. Further, the second processor 30 has a memory 31 as the data retaining unit. The memory 31 is a SRAM circuit, for example. The power consumption in a case where the second processor 30 is used to perform an order determination process is lower than the power consumption in a case where the first processor 10 is used to perform the same order determination process. In the following portion of this embodiment, a description will be made with the CPU as one example of the first processor 10 and the MCU as one example of the second processor 30.

The sensor 40 is a radio device for near field communication (NFC) or a radio device for Bluetooth, respectively detects a device such as the NFC tag or a Bluetooth beacon, and thereby detects that the electronic apparatus 1 is in a specific circumstance. The volatile memory 60 stores data that the CPU 10 and the MCU 30 use to perform prescribed processes, data that are results of data processing performed by the CPU 10 and MCU 30, and so forth. The volatile memory 60 is an electronic circuit component such as a dynamic random access memory (DRAM) or a static random access memory (SRAM). The non-volatile memory 65 stores computer programs or the like that are executed by the CPU 10 and the MCU 30. The non-volatile memory 65 is an electronic circuit component such as a mask read only memory (mask ROM), a programmable ROM (PROM), or a flash memory.

The communication module 70 performs data communication with information processing apparatuses such as another electronic apparatus and the server. The data communication may be either one of radio communication and wired communication. In a case of radio communication, the communication module 70 includes a radio circuit, a baseband circuit, an amplifier circuit, an antenna, and so forth, for example.

The battery 80 is a power supply source of the electronic apparatus 1, charges electrical charge when the electronic apparatus 1 is coupled to a power source adapter, discharges electrical charge when the electronic apparatus 1 is detached from the power source adapter, and supplies desired electrical charge to circuits in the electronic apparatus 1. The power source control circuit 85 is a control circuit of the battery 80, controls the charging rate of electrical charge to the battery, for example, and further controls the discharging amount of electrical charge to reduce the power consumption of the electronic apparatus 1 based on an instruction from the CPU 10. The power source control circuit 85 is a direct current-direct current (DC-DC) conversion circuit, for example. The bus 90 couples the circuits such as the CPU 10, the MCU 30, the sensor 40, the volatile memory 60, and the non-volatile memory 65 and functions as a path of mutual data transmission among the circuits.

Figure 3:
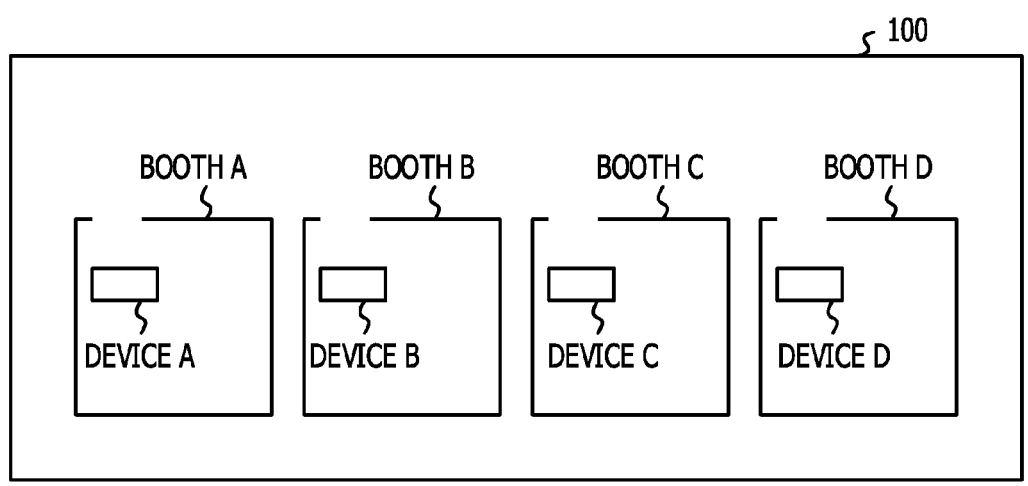
FIG. 3 is a diagram that illustrates a situation of use of the electronic apparatus in the first embodiment.

FIG. 3 is a diagram that illustrates a situation of use of the electronic apparatus 1 in the first embodiment. As one example of the situation of use of the electronic apparatus 1, a case is assumed where specific information or a specific application is provided from the server to the electronic apparatus 1 when a user carrying the electronic apparatus 1 goes around plural booths provided in an event site in a prescribed order. In FIG. 3, booths A, B, C, and D are provided in an event site 100. The booths are provided with devices A, B, C, and D for identifying the respective booths like the NFC tags or the Bluetooth beacons, for example. The user who visits the event site 100 places the electronic apparatus 1 close to the device in the booth and causes the sensor 40 to read the device. This allows the electronic apparatus 1 to recognize at which booth the user is. Here, in a case where the user goes around the booths in a specific order, for example, in the order of the booth A, the booth B, the booth C, and the booth D, prescribed information or a prescribed application is transmitted from the server to the electronic apparatus 1. In the following portion of this specification, all target objects that are detected by the sensor 40 will be referred to as "device". Examples of the devices may include a radio frequency (RF) tag other than the NFC tag and the Bluetooth beacon. Further, the tag such as the NFC tag may be an active tag that has a power source or a passive tag that itself has no power source.

Figure 4:
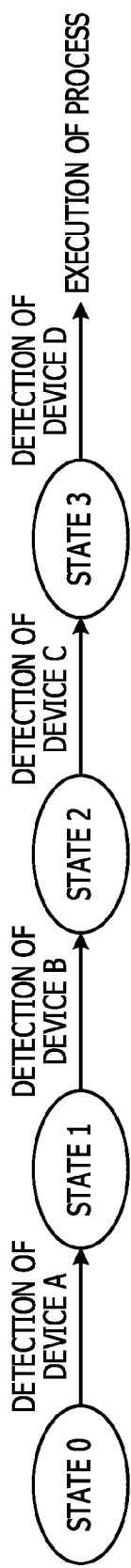
FIG. 4 is a state transition diagram in the first embodiment.

FIG. 4 is a state transition diagram of a case where the user visits the plural booths in the event site 100 illustrated in FIG. 3 in an order. The electronic apparatus 1 stores an order defined to be a usual route as the order of the booth A, the booth B, the booth C, and the booth D. "State 0" indicates a state where the user is yet to visit any booth. First, when the user visits the booth A in "state 0" and the sensor 40 of the electronic apparatus 1 detects the device A provided in the booth A, the state transits from "state 0" to "state 1". However, the state is maintained as "state 0" until the device A is detected in "state 0". That is, "state 1" indicates a state where the user has visited the booth A provided as the first booth of the usual route. Next, when the user visits the booth B and the sensor 40 of the electronic apparatus 1 detects the device B provided in the booth B, the state transits from "state 1" to "state 2". That is, "state 2" indicates a state where the user has visited the booth A and the booth B along the defined usual route. Similarly, in a case where the user further visits the booth C along the defined usual route, the state transits from "state 2" to "state 3". Finally, in a case where the user visits the booth D, the electronic apparatus 1 determines that the user has gone around all the booths along the provided usual route and transmits a demand for delivery of prescribed information or a prescribed application to the server. The server delivers, to the electronic apparatus 1, the prescribed information or application in response to the demand from the electronic apparatus 1. State information that indicates the state is stored in the MCU 30.

FIG. 5 is a diagram that illustrates one example of the order data that are retained by the electronic apparatus 1. The order data illustrated in FIG. 5 corresponds to the contents of state transitions illustrated in FIG. 4. The order data contains first condition data, second condition data, third condition data, and fourth condition data. Each of the condition data contains items of "source state of transition", "condition of state transition", "destination state of transition", "process", for example. The first condition data provide "state 0" as the source state of transition, "detection of device A" as the condition of the state transition, and "state 1" as the destination state of transition. Further, because a delivery demand process to the server is not executed at the point when the device A is detected, the item of process in the condition data is not provided. The values indicated in the column of "data amount" indicate data amounts of the respective condition data. Here, the value indicates that the data amount of the first condition data is 50 bytes. The value of the data amount does not have to be contained as a portion of the condition data but may be retained by a condition data amount retaining unit 13, which will be described below, as separate data from the condition data. Similarly, the second condition data provide "state 1" as the source state of transition, "detection of device B" as the condition of the state transition, and "state 2" as the destination state of transition. Further, because the delivery demand process to the server is not executed at the point when the device B is detected, the item of process is not provided. Further, the data amount of the second condition data is 50 bytes. Similarly, the third condition data provide "state 2" as the source state of transition, "detection of device C" as the condition of the state transition, and "state 3" as the destination state of transition. Because the delivery demand process to the server is not executed at the point when the device C is detected, the item of process is not provided. Further, the data amount of the third condition data is 50 bytes. Finally, the fourth condition data provide "state 3" as the source state of transition and "detection of device D" as the condition of the state transition. The device D is the device provided as the final stage of the order of the devices to be detected. Thus, there is no destination state of transition, and "delivery request to server" is provided in the item of process. Further, the data amount of the fourth condition data is 50 bytes. The data amount of the order data is the total of the data amounts of the condition data. In this example, the order data amount is 200 bytes.

As described above, the condition data are data that provide the conditions of transitions among the states, an aggregate of plural condition data serves as the order data. Further, the order data are data that indicate a detection order of the devices, that is, a usual route of the booths in this embodiment. The electronic apparatus 1 manages which state the electronic apparatus 1 is in at each point based on the order data.

Figure 6:
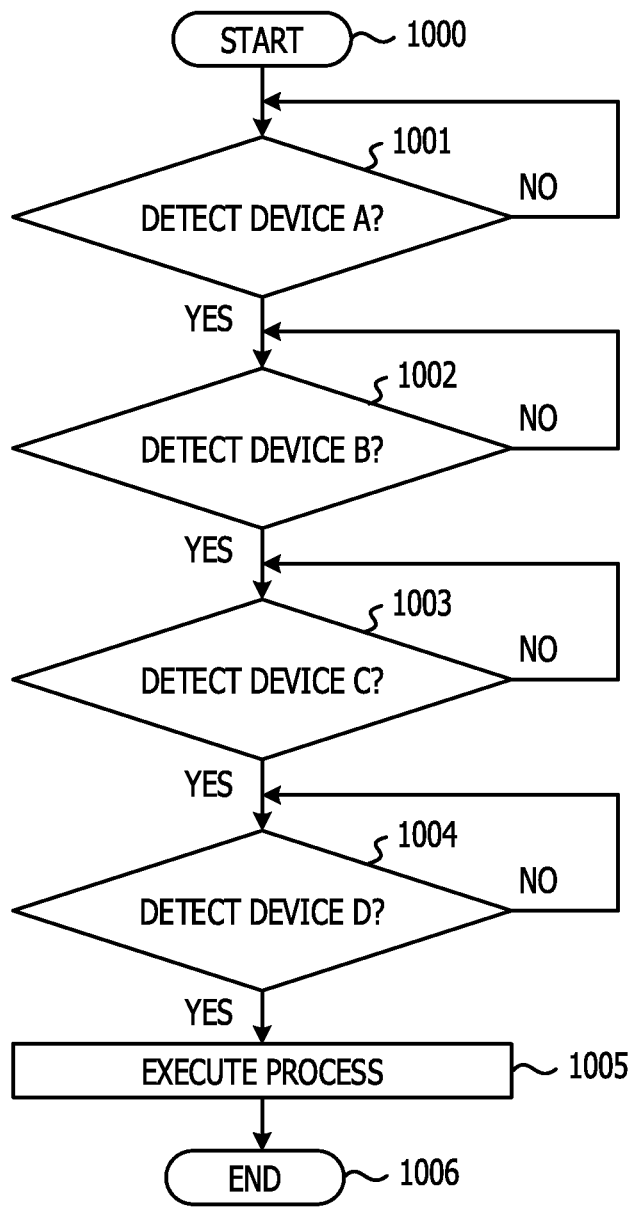
FIG. 6 is a process flowchart of the electronic apparatus in the first embodiment.

FIG. 6 is a flowchart of processes that the electronic apparatus 1 performs based on the order data illustrated in FIG. 5. A process flow is started by process 1000. In process 1001, the electronic apparatus 1 determines whether or not the sensor 40 detects the device A. In a case where the device A is detected, the process moves to process 1002. In a case where the device A is not detected, the electronic apparatus 1 repeats process 1001. In process 1002, the electronic apparatus 1 determines whether or not the sensor 40 detects the device B. In a case where the device B is detected, the process moves to process 1003. In a case where the device B is not detected, the electronic apparatus 1 repeats process 1002. In process 1003, the electronic apparatus 1 determines whether or not the sensor 40 detects the device C. In a case where the device C is detected, the process moves to process 1004. In a case where the device C is not detected, the electronic apparatus 1 repeats process 1003. In process 1004, the electronic apparatus 1 determines whether or not the sensor 40 detects the device D. In a case where the device D is detected, the process moves to process 1005. In a case where the device D is not detected, the electronic apparatus 1 repeats process 1004. In process 1005, the electronic apparatus 1 executes a process, here, executes the delivery request of the prescribed information or application to the server, and the process is finished in process 1006.

Figure 7:
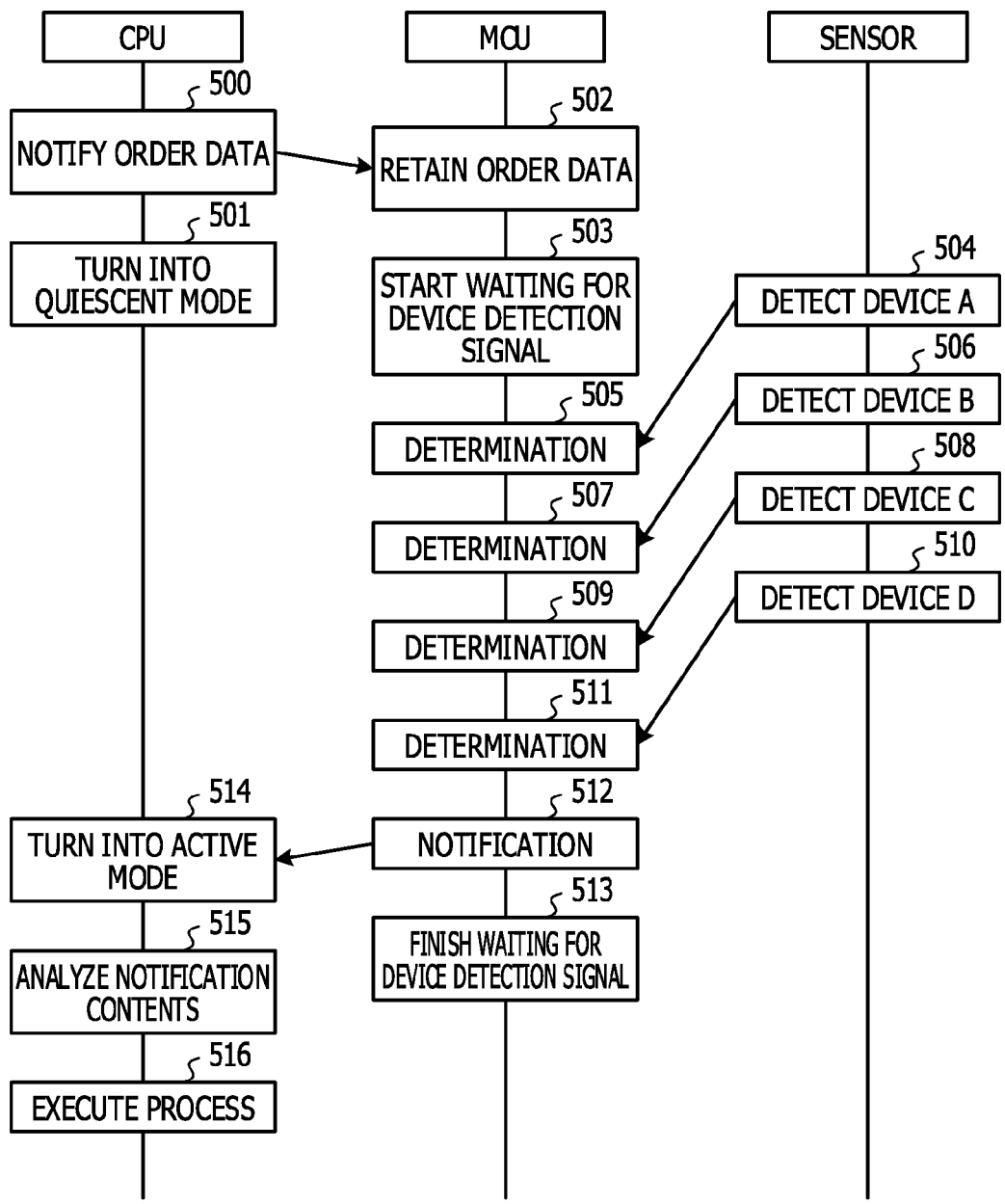
FIG. 7 is a diagram that explains a process flow among a CPU, an MCU, and a sensor in the first embodiment.

FIG. 7 is a diagram that illustrates process examples of the CPU 10, the MCU 30, and the sensor 40 in the process by the electronic apparatus 1, which is illustrated in FIG. 6. FIG. 7 illustrates an example where the data amount of the order data is smaller than the available capacity of the memory 31 of the MCU 30. First, in process 500, the CPU 10 transmits the order data that contain the first condition data, the second condition data, the third condition data, and the fourth condition data to the MCU 30. Thereafter, in process 501, the CPU 10 turns into a power saving mode, for example, the quiescent mode in order to reduce the power consumption of the CPU 10 in a case where there are no data to be processed by the CPU 10. In process 502, the MCU 30 retains the order data that are transmitted from the CPU 10 in the memory 31. It is assumed that the MCU 30 does not use the volatile memory 60 as a storage place of the order data that are transmitted from the CPU 10. The reason is because the time that the MCU 30 uses to refer to the order data in the order determination becomes long in a case where the order data are stored in the volatile memory 60, compared to a case where the order data are stored in the memory 31, and the response speed of the MCU 30 thus decreases. The MCU 30 refers to the order data stored in the memory 31 and may thereby recognize that the processes to be executed by the MCU 30 are {recognizing the transition to "state 1" in a case where the device A is detected in "state 0"}, {recognizing the transition to "state 2" in a case where the device B is detected in "state 1"}, {recognizing the transition to "state 3" in a case where the device C is detected in "state 2"}, and {notifying the CPU 10 of the detection in a case where the device D is detected in "state 3"}. Then, in process 503, the MCU 30 starts waiting for the device detection signal from the sensor 40. In process 504, the sensor 40 detects the device A and notifies the MCU 30 that the device A is detected. In process 505, the MCU 30 receives the device detection signal from the sensor 40 and refers to the first condition data among the order data stored in the memory 31. The MCU 30 then determines that the condition provided by the first condition data is satisfied, that is, the state has transited from "state 0" to "state 1". Thereafter, in processes 506 and 508, the sensor 40 sequentially transmits, to the MCU 30, the device detection signal indicating that the device B is detected and the device detection signal indicating that the device C is detected. In processes 507 and 509, the MCU 30 refers to the condition data that are contained in the order data retained in the memory 31 based on receptions of the respective device detection signals and determines that the states has sequentially transited to "state 2" and "state 3". In process 510, the sensor 40 transmits, to the MCU 30, the device detection signal indicating that the device D is detected. In process 511, the MCU 30 determines that the fourth condition provided by the fourth condition data as the final condition data is satisfied, based on the received device detection signal. In process 512, the MCU 30 performs a notification to the CPU 10. This notification notifies the CPU 10 that the device A, the device B, the device C, and the device D are detected along the order that is provided by the order data transmitted from the CPU 10. After process 512, in process 513, the MCU 30 finishes waiting for the device detection signal from the sensor 40.

In process 514, the CPU 10 switches the power mode of the CPU 10 to the active mode based on the notification from the MCU 30. Then, in process 515, the CPU 10 analyzes the contents of the received device detection signals. That is, the CPU 10 recognizes that the device A, the device B, the device C, and the device D are detected in this order based on the device detection signals. Further, the CPU 10 perceives the processes performed by the CPU 10 by referring to the order data. Then, in process 516, the CPU 10 executes the process of the delivery request of the information or application to the server.

As illustrated in FIG. 7, the CPU 10 notifies the MCU 30 of the order data in process 500 and thereafter turns into the quiescent mode in process 501 in a case where the CPU 10 does not have to perform other data processes. Then, in process 514, the CPU 10 returns to the active mode in a case where the CPU 10 receives the notification from the MCU 30. Accordingly, the power consumption of the CPU 10 may be reduced compared to a case where the CPU 10 itself performs the order determination of the device detection. The MCU 30 starts waiting for the device detection signal in process 503, finishes waiting for the device detection signal in process 513, and may thereby reduce the power consumption of the MCU 30.

Figure 8:
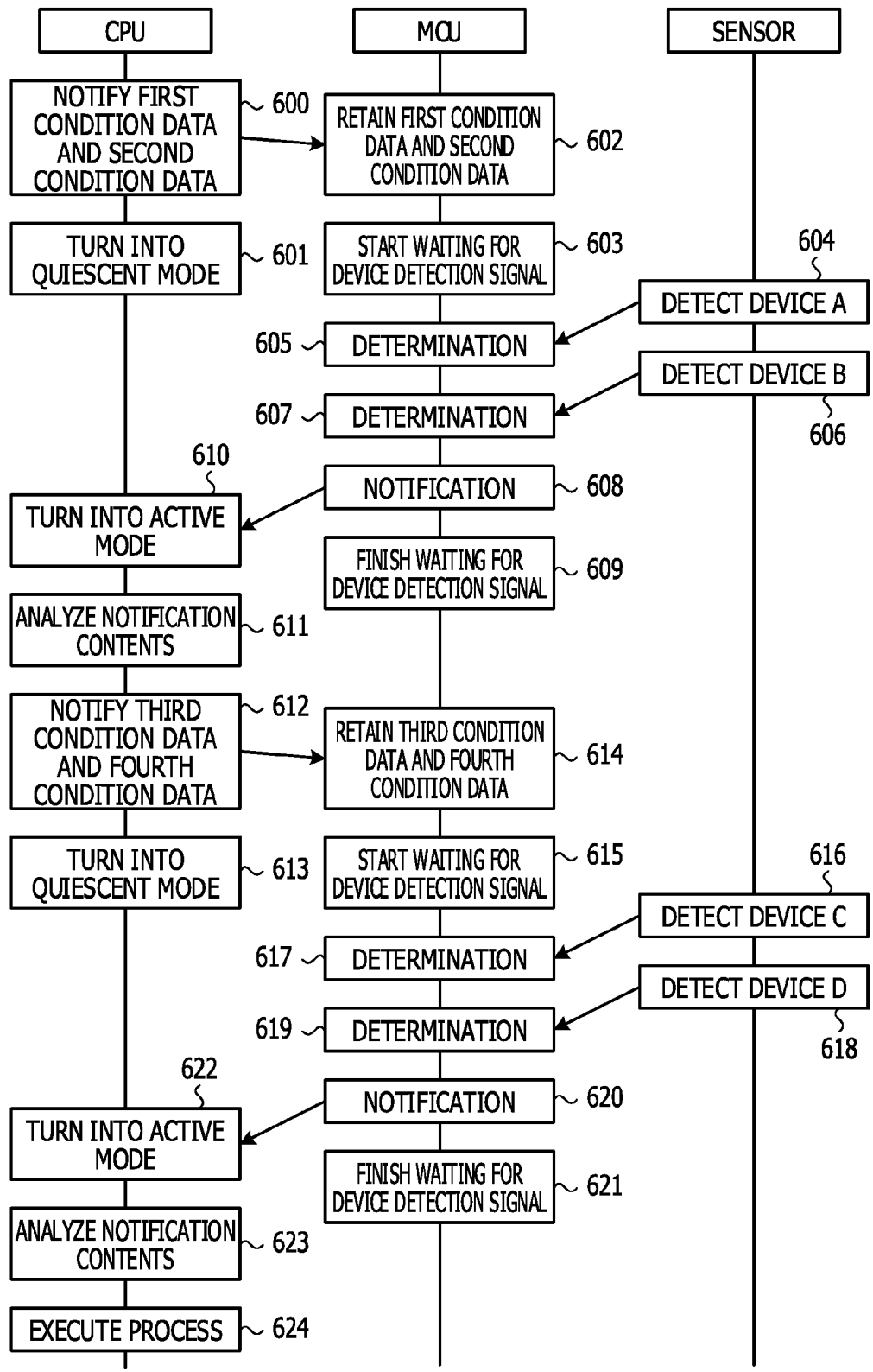
FIG. 8 is a diagram that explains a process flow among the CPU, the MCU, and the sensor in the first embodiment.

Similarly to FIG. 7, FIG. 8 is a diagram that illustrates processes of the CPU 10, the MCU 30, and the sensor 40 in the process by the electronic apparatus 1, which is illustrated in FIG. 6. FIG. 7 illustrates a case where the available capacity of the memory 31 of the MCU 30 is larger than the whole data amount of the order data. However, FIG. 8 illustrates a case where the available capacity of the memory 31 is smaller than the whole data amount of the order data. For example, in a case where the whole data amount of the order data is 200 bytes as illustrated in FIG. 5 and the available capacity of the memory 31 is 130 bytes, for example, all of the condition data contained in the order data may not be stored in the memory 31. In this case, in process 600, the CPU 10 extracts the first condition data and the second condition data, which are a portion of the plural condition data contained in the order data, transmits those to the MCU 30, and turns into the quiescent mode in process 601. Because each of the data amounts of the first condition data and the second condition data is 50 bytes, the total data amount of the first condition data and the second condition data is 100 bytes and is not larger than 130 bytes of the available capacity of the memory 31. Detailed processes of those will be described below. Thus, in process 602, the MCU 30 may store the first condition data and the second condition data that are received from the CPU 10 in the memory 31. The MCU 30 recognizes that the processes to be executed by the MCU 30 are {recognizing the transition to "state 1" in a case where the device A is detected in "state 0"} and {notifying the CPU 10 of the detection in a case where the device B is detected in "state 1"} based on the condition data stored in the memory 31. Here, a supplementary description will be made about the notification to the CPU 10 that is performed by the MCU 30 in a case where the device B is detected in "state 1". The second condition data provide that the state transits to "state 2" in a case where the device B is detected in "state 1". Meanwhile, the contents of a determination made by the MCU 30 after the movement to "state 2" are indicated in the third condition data, and the third condition data are not notified to the MCU 30 at this point. Thus, the MCU 30 performs a notification to the CPU 10 in a case where the device B is detected in "state 1". The CPU 10 then notifies the MCU 30 of the condition data that contain the third condition data as the subsequent condition data based on the notification from the MCU 30. Detailed processes of those will be described below.

In FIG. 8, the MCU 30 that receives the first condition data and the second condition data from the CPU 10 starts waiting for the device detection signal in process 603. In processes 604, the sensor 40 detects the device A and transmits the device detection signal to the MCU 30. In process 605, the MCU 30 receives the device detection signal and refers to the first condition data stored in the memory 31. The MCU 30 then determines that the state has transited from "state 0" to "state 1". Thereafter, in process 606, the sensor 40 detects the device B and transmits the device detection signal to the MCU 30. In process 607, the MCU 30 determines that the condition provided by the second condition data is satisfied and performs a notification to the CPU 10 in process 608. This notification notifies the CPU 10 that the device A and the device B are detected along the first condition data and the second condition data that are transmitted from the CPU 10. After process 608, in process 609, the MCU 30 finishes waiting for the device detection signal. In process 610, the CPU 10 switches the power mode of the CPU 10 to the active mode based on the notification from the MCU 30. In process 611, the CPU 10 analyzes whether the notification received from the MCU 30 is the result of completion of a determination about all the condition data contained in the order data or the result of completion of a determination about partial condition data. The CPU 10 acknowledges that the notification indicates completion of the determination about partial condition data based on the fact that the notification received from the MCU 30 is derived from detection of the device B. Then, in process 612, the CPU 10 notifies the MCU 30 of the condition data that are the third or subsequent condition data, here, the third condition data and the fourth condition data and turns an operation mode of the CPU 10 into the quiescent mode in process 613. Here, it is assumed that the available capacity of the memory 31 is 130 bytes, for example, which is larger than 100 bytes that is the total value of the data amounts of the third condition data and the fourth condition data. In process 614, the MCU 30 causes the memory 31 to retain the third condition data and the fourth condition data that are transmitted from the CPU 10. In process 615, the MCU 30 starts waiting for the device detection signal. In processes 616, the sensor 40 detects the device C and transmits the device detection signal to the MCU 30. In process 617, the MCU 30 receives the device detection signal, refers to the third condition data stored in the memory 31, and recognizes that the state has transited from "state 2" to "state 3". In process 618, the sensor 40 detects the device D and transmits the device detection signal to the MCU 30. In process 619, the MCU 30 receives the device detection signal, determines that the condition provided by the fourth condition data is satisfied, and performs a notification to the CPU 10 in process 620. This notification notifies the CPU 10 that the device C and the device D are detected in a prescribed order. In process 621, the MCU 30 finishes waiting for the device detection signal. In process 622, the CPU 10 switches the power mode of the CPU 10 to the active mode based on the notification from the MCU 30. In process 623, the CPU 10 analyzes the contents of the notification received from the MCU 30. In this analysis, the CPU 10 recognizes that the device A, the device B, the device C, and the device D are detected in the order provided by the order data. Then, in process 624, the CPU 10 executes the process of the delivery request of the information or application to the server.

As described above, in a case where the available capacity of the memory 31 is smaller than the whole capacity of the order data retained by the CPU 10, the CPU 10 extracts a portion of the condition data from the order data and sequentially transmits those to the MCU 30. Accordingly, the CPU 10 may cause the MCU 30 to execute the order determination of plural device detection signals. As a result, an increase in the power consumption of the CPU 10 may be reduced.

Figure 9:
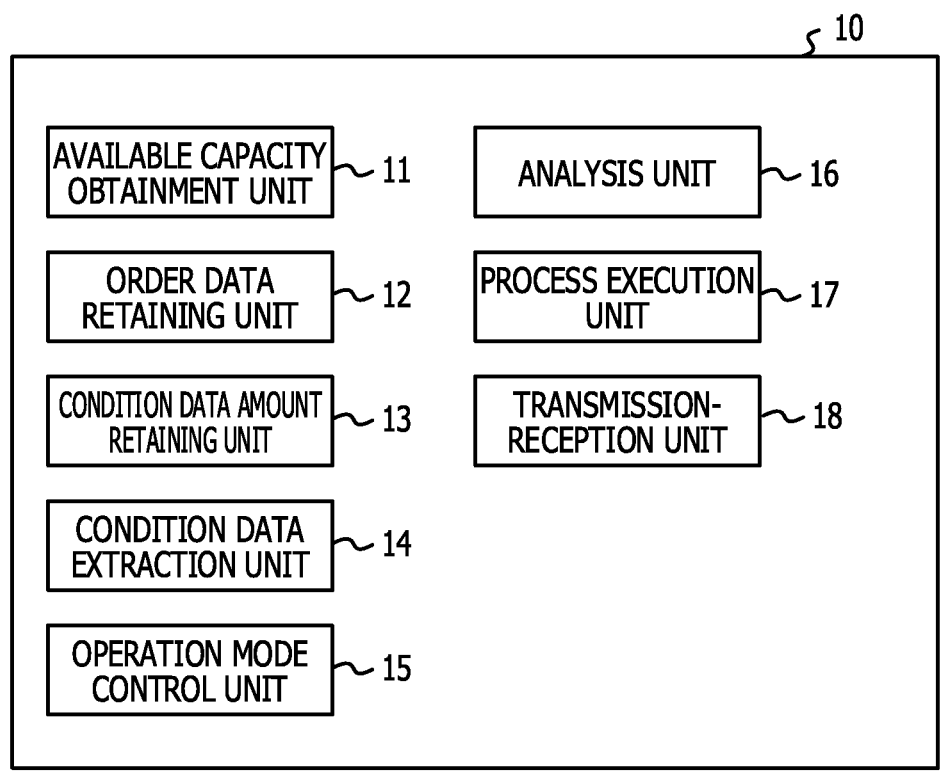
FIG. 9 is a function block diagram of the CPU in the first embodiment.

FIG. 9 is a function block diagram of the CPU 10 in the first embodiment. The CPU 10 executes prescribed computer programs that are stored in the non-volatile memory 65 or the like and thereby functions as function blocks illustrated in FIG. 9. The CPU 10 functions as an available capacity obtainment unit 11, an order data retaining unit 12, a condition data amount retaining unit 13, a condition data extraction unit 14, an operation mode control unit 15, an analysis unit 16, a process execution unit 17, and a transmission-reception unit 18. The available capacity obtainment unit 11 obtains the available capacity of the memory 31 of the MCU 30. For example, when the order data is sent to the MCU 30, the available capacity obtainment unit 11 inquires of an available capacity calculation unit 32, which will be described below, of the MCU 30 how large the available capacity of the memory 31 is. The available capacity obtainment unit 11 then retains the value of the available capacity based on an answer from the available capacity calculation unit 32 of the MCU 30. The order data retaining unit 12 retains the order data. The order data may be data that the CPU 10 executes a specific application to generate or data that an external apparatus of the CPU 10 provides and the external apparatus indicates to the CPU 10. The condition data amount retaining unit 13 retains the data amounts of the condition data contained in the order data. The condition data extraction unit 14 extracts a portion of the condition data from the order data retained in the order data retaining unit 12. This condition data extraction is executed based on the available capacity retained in the available capacity obtainment unit 11 and the data amounts of the condition data retained in the condition data amount retaining unit 13. Details of a method of extracting a portion of the condition data from the order data that contain plural condition data will be described below.

The operation mode control unit 15 switches the operation modes of the CPU 10. The CPU 10 has plural operation modes such as the active mode and the quiescent mode, for example. The active mode is a mode in which both of the CPU 10 and the bus 90 operate while receiving power and clock signals. The quiescent mode is a state where the clock signal supplied to the CPU 10 is stopped and the clock signal supplied to the bus 90 is also stopped. The CPU 10 may have a standby mode, a power-off mode, and so forth as other operation modes. The standby mode is a state where the clock signal supplied to the CPU 10 is stopped but the clock signals are supplied to the bus 90. The power-off mode is a state where power supply to the CPU 10 is stopped and power supply to the bus 90 is also stopped. The operation mode control unit 15 appropriately switches the plural operation modes and thereby reduces the power consumption of the CPU 10. The four operation modes given here are merely examples for describing plural operation modes with different power consumption, and there is no intention to limit operation modes of the electronic apparatus 1 to the operation modes disclosed herein. Further, there is no intention to limit embodiments by the names of the operation modes, and other names may be used. The operation mode control unit 15 notifies the MCU 30 of the condition data and thereafter switches the operation mode of the CPU 10 to the quiescent mode in a case where there is no data to be processed. In this case, the CPU 10 may turn into the standby mode or the power-off mode instead of the quiescent mode. Further, the operation mode control unit 15 switches the operation mode of the CPU 10 to the active mode based on the notification from the MCU 30.

The analysis unit 16 analyzes the contents of the notification received from the MCU 30. In the analysis by the analysis unit 16, in a case where a determination is made that the notification from the MCU 30 is derived from detection of the final device provided by the order that is identified by the order data, the analysis unit 16 instructs the process execution unit 17, which will be described below, to execute a process. Further, in the analysis by the analysis unit 16, in a case where a determination is made that the notification from the MCU 30 is derived from detection of the intermediate device provided by the order that is identified by the order data, the analysis unit 16 notifies the condition data extraction unit 14 to extract further condition data. The process execution unit 17 executes a prescribed process based on a notification from the analysis unit 16. The process execution unit 17 may be realized by execution of a specific application by the CPU 10. The transmission-reception unit 18 transmits the condition data from the CPU 10 to the MCU 30 and receives notifications transmitted from the MCU 30 to the CPU 10. All of the function blocks illustrated in FIG. 9 do not have to be realized by the CPU 10. For example, the order data retaining unit 12 may be realized by using the volatile memory 60 or the non-volatile memory 65, which are illustrated in FIG. 2, and at least a portion of the function of the operation mode control unit 15 may be realized by the power source control circuit 85.

Figure 10:
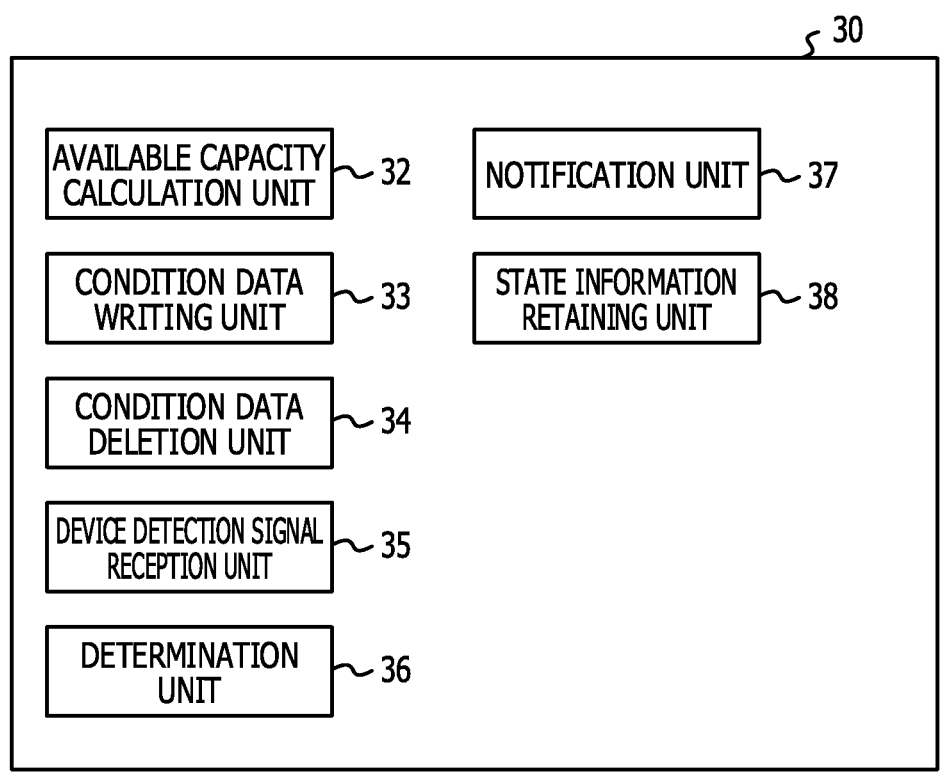
FIG. 10 is a function block diagram of the MCU in the first embodiment.

FIG. 10 is a function block diagram of the MCU 30. The MCU 30 executes prescribed computer programs that are stored in the non-volatile memory 65 or the like and thereby functions as function blocks illustrated in FIG. 10. The MCU 30 functions as the available capacity calculation unit 32, a condition data writing unit 33, a condition data deletion unit 34, a device detection signal reception unit 35, a determination unit 36, a notification unit 37, and a state information retaining unit 38. The available capacity calculation unit 32 calculates the available capacity of the memory 31, responds to a demand from the available capacity obtainment unit 11 of the CPU 10, and notifies the available capacity obtainment unit 11 of the calculated available capacity. The condition data writing unit 33 writes the condition data transmitted from the CPU 10 in the memory 31. The condition data deletion unit 34 deletes the condition data written in the memory 31. The device detection signal reception unit 35 receives the device detection signal transmitted from the sensor 40. The determination unit 36 determines whether or not the received device detection signal matches the condition that is provided by the condition data stored in the memory 31. The notification unit 37 performs a notification to the CPU 10 in a case where the final condition among the conditions that are provided by the condition data stored in the memory 31 is satisfied, that is, a case where the final device provided by the condition data is detected. The state information retaining unit 38 retains state information that indicates which state among the plural states that are contained in the condition data stored in the memory 31 the present state is at.

In FIGS. 9 and 10, a description is made on the assumption that the notification transmitted by the notification unit 37 of the MCU 30 is received by the operation mode control unit 15 and the analysis unit 16 of the CPU 10. This indicates that the notification transmitted by the notification unit 37 contains both of an instruction for switching the operation modes of the CPU 10 and information that identifies the detected device. However, the notification unit 37 may individually transmit the notification that contains the instruction for switching the operation modes of the CPU 10 and the notification that contains the information that identifies the detected device, and the operation mode control unit 15 and the analysis unit 16 may individually receive the respective notifications.

Figure 11:
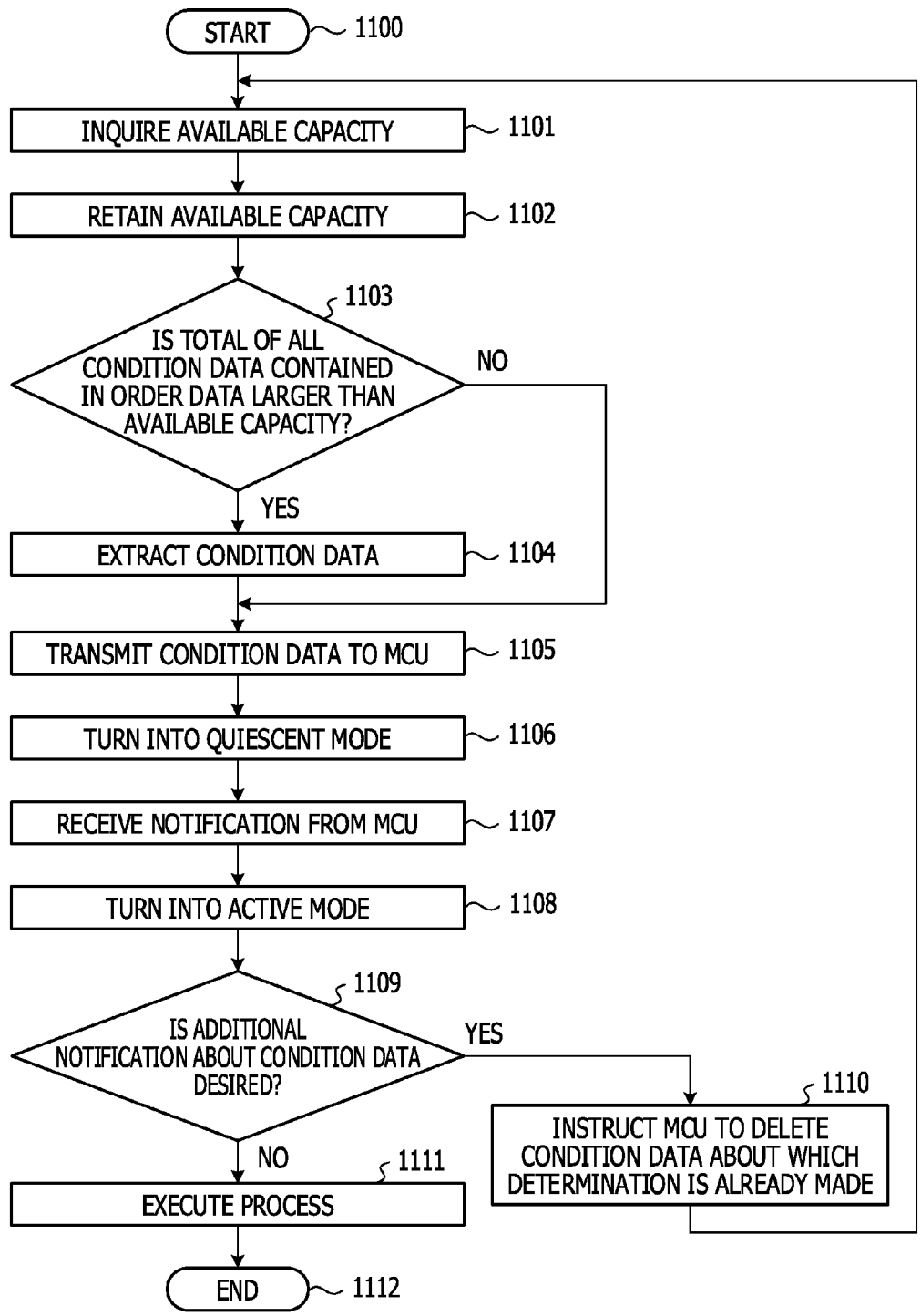
FIG. 11 is a process flowchart of the CPU in the first embodiment.

FIG. 11 is a flowchart of processes executed by the CPU 10. A process flow is started by process 1100. In process 1101, the available capacity obtainment unit 11 inquires of the MCU 30 the available capacity of the memory 31. In process 1102, the available capacity obtainment unit 11 retains the value of the available capacity notified from the MCU 30. In process 1103, the condition data extraction unit 14 determines whether or not the total of the condition data amounts retained in the condition data amount retaining unit 13 is larger than the available capacity retained in the available capacity obtainment unit 11. In a case where the total of the condition data amounts is larger than the available capacity, the process progresses to process 1104. In a case where the total of the condition data amounts is not larger than the available capacity, the process progresses to process 1105. In process 1104, the condition data extraction unit 14 extracts a portion of the condition data from plural condition data contained in the order data. Details of an extraction method of the condition data will be described below. In process 1105, the transmission-reception unit 18 transmits the condition data extracted by the condition data extraction unit 14 to the MCU 30. In process 1106, the operation mode control unit 15 turns the operation mode of the CPU 10 into the quiescent mode. In process 1107, the transmission-reception unit 18 receives a notification from the MCU 30. In process 1108, the operation mode control unit 15 turns the operation mode of the CPU 10 to the active mode. In process 1109, the analysis unit 16 analyzes the contents of the notification from the MCU 30 and determines whether or not the condition data has to be additionally notified to the MCU 30. In process 1109, in a case where a determination is made that there is the additional condition data to be transmitted to the MCU 30, the process progresses to process 1110. In process 1110, the condition data extraction unit 14 notifies the MCU 30 to delete the condition data about which the determination is already made from the memory 31, and the process returns to process 1101. In process 1109, in a case where there is no additional condition data to be transmitted to the MCU 30, the process progresses to process 1111. In process 1111, the process execution unit 17 executes a prescribed process, and the process is finished in process 1112.

Figure 12:
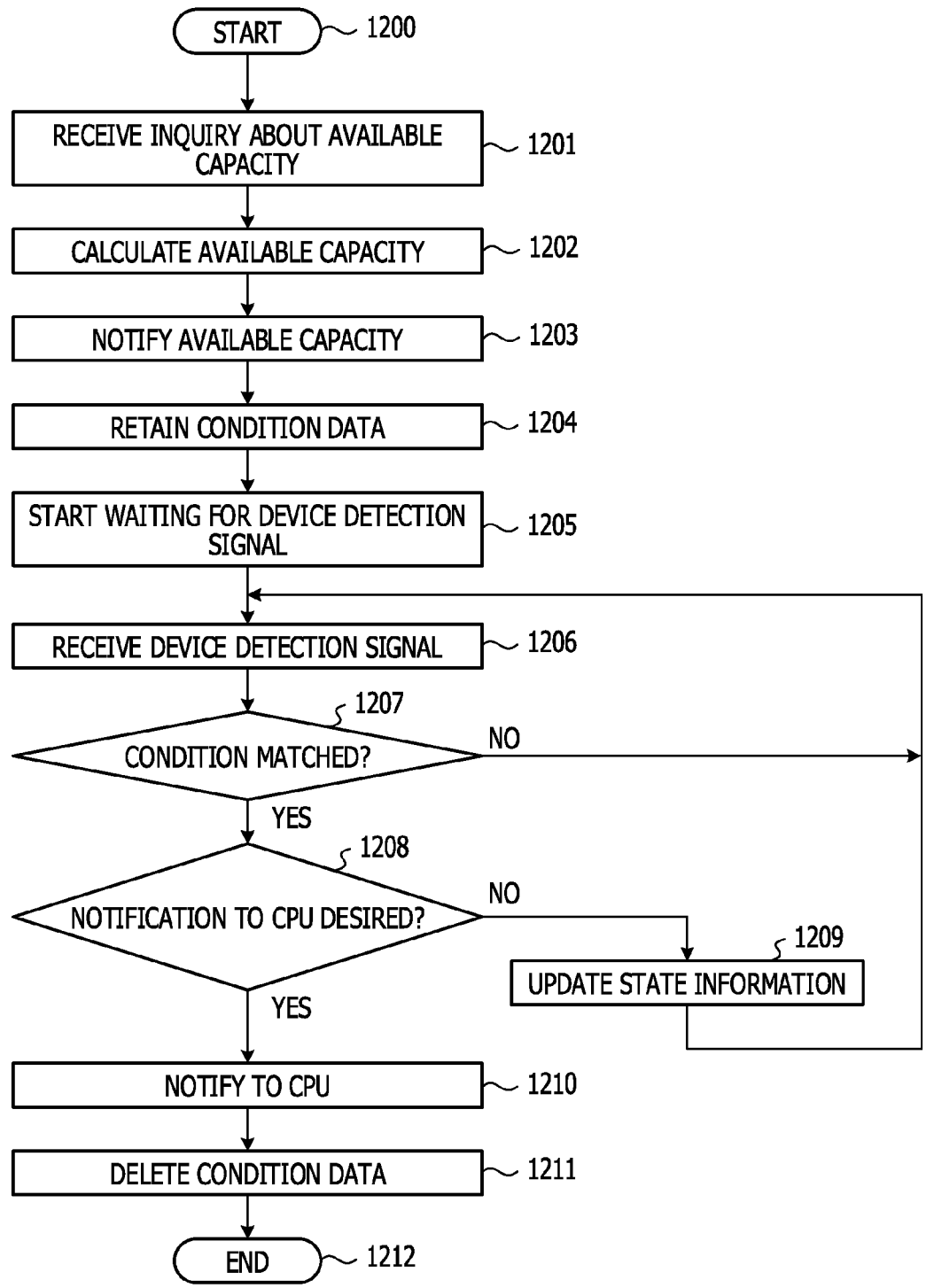
FIG. 12 is a process flowchart of the MCU in the first embodiment.

FIG. 12 is a flowchart of processes executed by the MCU 30. A process flow is started by process 1200. In process 1201, the available capacity calculation unit 32 receives an inquiry about the available capacity from the available capacity obtainment unit 11 of the CPU 10. In process 1202, the available capacity calculation unit 32 calculates the available capacity of the memory 31. In process 1203, the available capacity calculation unit 32 notifies the available capacity obtainment unit 11 of the CPU 10 of the calculated available capacity. In process 1204, the condition data writing unit 33 writes the condition data transmitted from the CPU 10 in the memory 31, and the memory 31 retains the condition data. In process 1205, the device detection signal reception unit 35 starts waiting for the device detection signal. In process 1206, the device detection signal reception unit 35 receives the device detection signal from the sensor 40. In process 1207, the determination unit 36 determines whether or not the device identified by the received device detection signal and the state identified by the state information stored in the state information retaining unit 38 match the condition that is identified by the condition data stored in the memory 31. In a case where the detected device and the state match the condition identified by the condition data, the process moves to the process 1208. In a case where the detected device and the state do not match the condition identified by the condition data, the process returns to process 1206. In process 1208, the determination unit 36 determines whether or not a notification to the CPU 10 is desired. In a case where the notification to the CPU 10 is not desired, the process moves to process 1209. In process 1209, the state information retaining unit 38 updates and retains the state information. In a case where the notification to the CPU 10 is desired, in process 1210, the notification unit 37 performs the notification to the CPU 10. This notification contains at least information that identifies the final device that is detected. In process 1211, the condition data deletion unit 34 is notified, from the condition data extraction unit 14 of the CPU 10, to delete the condition data about which the determination is already made from the memory 31 and deletes the condition data from the memory 31. The process is finished in process 1212.

FIGS. 13A, 13B, and 13C are diagrams that explain a method of extracting a portion of the condition data to be transmitted to the MCU 30 from the order data. The CPU 10 first retains the order data in the order data retaining unit 12. As illustrated in FIG. 5, the total data amount of the plural condition data contained in the order data is 200 bytes. Here, if the available capacity of the memory 31 is 130 bytes, all data of the order data may not be written in the memory 31. Thus, the condition data extraction unit 14 first extracts the first condition data that are first stage condition data in the order data. The "first stage condition data" indicates the condition data that provide the state, which is not provided as the destination state of transition in any condition data, as the source state of transition or the condition data that are specified as the first stage condition data in the order data. In the order data illustrated in FIG. 5, the first condition data serve as the first stage condition data. The data amount of the first condition data is 50 bytes and is smaller than the available capacity of the memory 31. Thus, the condition data extraction unit 14 fixes the first condition data as the condition data to be notified to the MCU 30. This situation is illustrated in FIG. 13A. The condition data extraction unit 14 next extracts the condition data that provide "state 1" as the source state of transition, that is, the second condition data, based on the fact that the destination state of transition of the first condition data is "state 1". The data amount of the second condition data is 50 bytes. The total data amount of the first condition data and the second condition data is 100 bytes and is smaller than 130 bytes of the available capacity of the memory 31. Thus, the condition data extraction unit 14 fixes the second condition data as the condition data to be notified to the MCU 30. This situation is illustrated in FIG. 13B. The condition data extraction unit 14 next extracts the condition data that provide "state 2" as the source state of transition, that is, the third condition data, based on the fact that the destination state of transition of the second condition data is "state 2". The data amount of the third condition data is 50 bytes. The total data amount of the first condition data, the second condition data, and the third condition data is 150 bytes and is larger than 130 bytes of the available capacity of the memory 31. Thus, the condition data extraction unit 14 determines that the third condition data may not be contained in the condition data to be notified to the MCU 30. As a result, the condition data extraction unit 14 decides the first condition data and the second condition data as the condition data to be notified to the MCU 30. The combination of the first condition data and the second condition data will be referred to as partial order data. The condition data extraction unit 14 further deletes "state 2" that is provided as the destination state of transition in provision contents of the extracted second condition data and rewrites the provision in the column of "process" to "notify to CPU". Specifically, the condition data extraction unit 14 confirms whether or not the state provided as the destination state of transition is provided as the source state of transition of any other condition data with respect to all the condition data contained in the fixed partial order data. Here, the destination state of transition of the first condition data is provided as "state 1", and this "state 1" is also provided as the source state of transition of the second condition data. That is, after the state transits from "state 0" to "state 1", the MCU 30 continues the order determination of the device detection. On the other hand, "state 2" is provided as the destination state of transition of the second condition data, but none of condition data contained in the partial order data provide this "state 2" as the source state of transition. In other words, after the state transits from "state 1" to "state 2", the MCU 30 is not capable of performing the order determination based on the partial order data. In this case, the CPU 10 receives, from the MCU 30, the notification indicating that all determinations about the partial order data, which are previously instructed, are completed and has to instruct next partial order data to the MCU 30. Thus, the condition data extraction unit 14 deletes the provision of "state 2" as the destination state of transition of the second condition data and rewrites the contents of the second condition data so that "notify to CPU" is provided as the content of the column of the process. This situation is illustrated in FIG. 13C. The rewritten partial order data are notified to the MCU 30.

As described above, even in a case where all of the order data may not be stored in the memory 31, the partial order data extracted from the order data are notified to the MCU 30, and the MCU 30 may thereby be caused to execute the order determination of the device detection. Further, the MCU 30 is caused to execute the order determination of the device detection, and the power consumption of the CPU 10 may thereby be reduced.

As described above, a description is made about an example where the electronic apparatus 1 receives delivery of prescribed information or a prescribed application from the server in a case where the user goes around the plural booths provided in the event site 100 in a defined order. However, this embodiment is not limited to the case where the electronic apparatus 1 performs a delivery request of information or an application to the server. Here, another application example of the first embodiment will be described.

Figure 14:
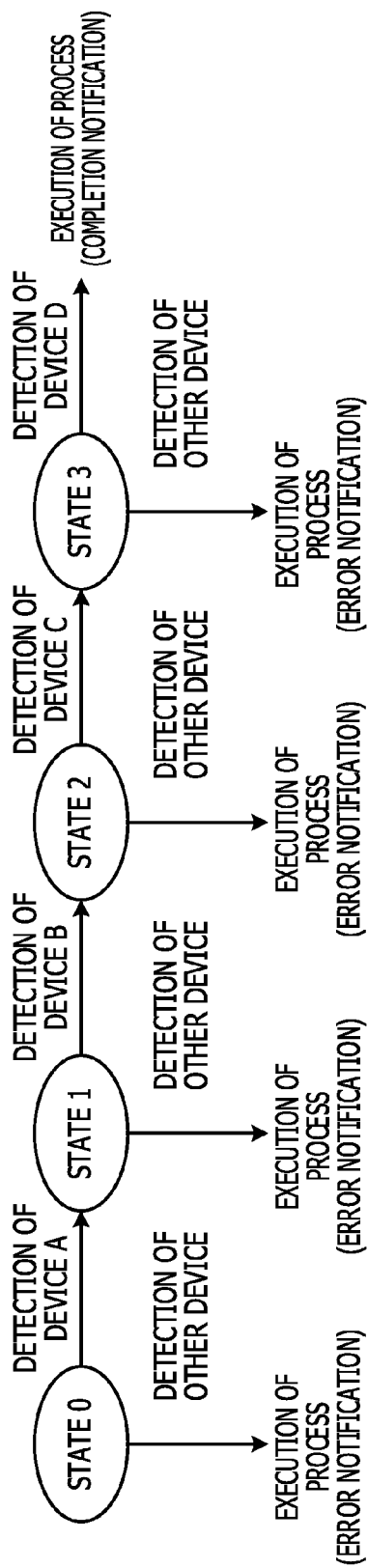
FIG. 14 is another state transition diagram in the first embodiment.

For example, a description will be made about an example where the sound output unit 50 or the display unit 55 of the electronic apparatus 1 is used to notify a worker who operates an apparatus that has plural operating units that are mutually linked of a completion notification in a case where the plural operating units are operated in an appropriate order and of an error notification in a case where the operating units are operated in a wrong order. Devices such as the NFC tags are provided in the operating units, and the sensor 40 detects the devices when the worker performs work with the operating units. An operating unit A, an operating unit B, an operating unit C, and an operating unit D in an apparatus are provided with a device A, a device B, a device C, and a device D, respectively. FIG. 14 illustrates a state transition diagram in a case where the appropriate work procedure is the operation in the order of the operating unit A, the operating unit B, the operating unit C, and the operating unit D. First, when the device A is detected in "state 0", this is determined as the appropriate work procedure, and the state moves to "state 1". However, in a case where the device other than the device A is detected, notification sound is output from the sound output unit 50, for example, of the electronic apparatus 1 in order to notify a user that the work procedure is not appropriate. Further, when the device B is detected in "state 1", this is determined as the appropriate work procedure, and the state moves to "state 2". However, in a case where the device other than the device B is detected, notification sound that notifies an error is output from the sound output unit 50 of the electronic apparatus 1. Thereafter, in a case where the device C and the device D are detected in the appropriate order, notification sound that notifies completion is output from the sound output unit 50, for example, of the electronic apparatus 1, indicating that the work is correctly finished. The function of executing this process may be built in the electronic apparatus 1 in advance as a dedicated function or may be realized by executing an application that is downloaded after manufacturing of the electronic apparatus 1.

As in this application example, the first embodiment is applicable to an example where the electronic apparatus 1 executes a prescribed process in a case where the devices are detected in a different order from a prescribed order in addition to a case where the devices are detected in a prescribed order. In this case also, the CPU 10 notifies the MCU 30 of at least a portion of the condition data of the order data, the MCU 30 may thereby be caused to execute the order determination of the device detection, and the power consumption of the CPU 10 may thereby be reduced.

<Second embodiment>

In the first embodiment, a description is made with an example where the state transition diagram may be expressed as a diagram in which plural states are arranged in a single line, as illustrated in FIGS. 4 and 14. In a second embodiment, a description will be made about an example where the state transition diagram branches and contains plural state transition branches. The hardware configuration illustrated in FIG. 2 may be applied as a hardware configuration of the electronic apparatus 1 in the second embodiment. Thus, a description thereof will not be made.

Figure 15:
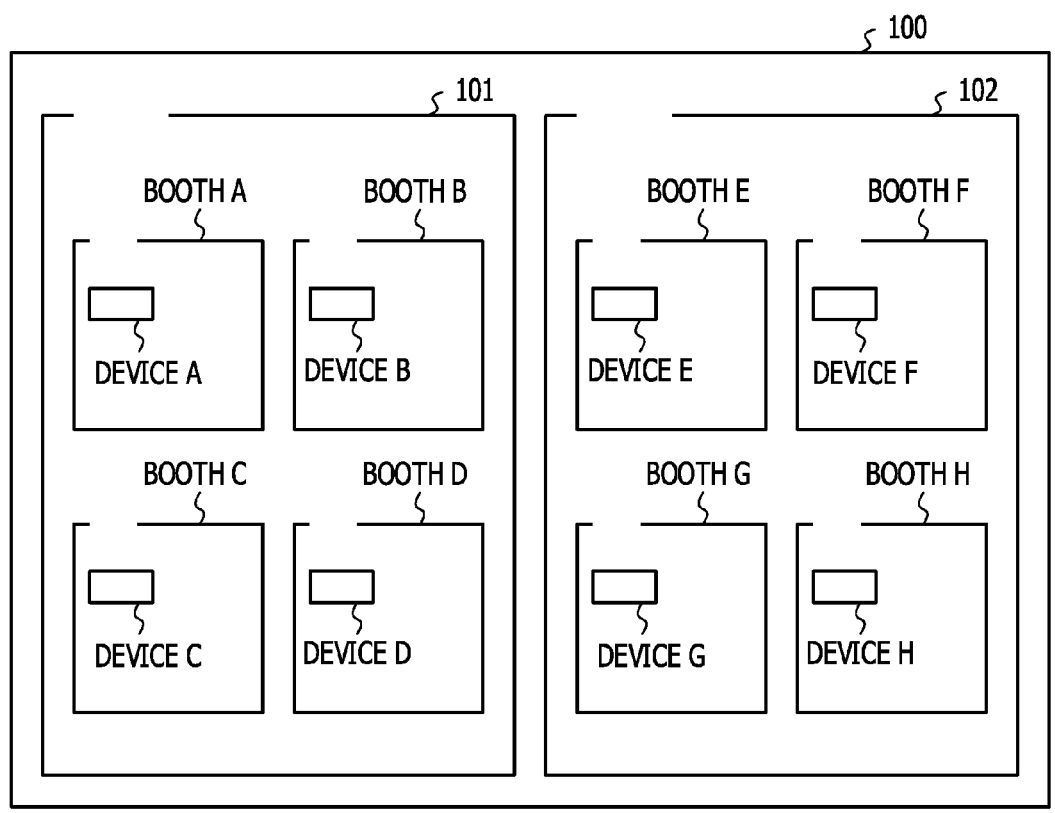
FIG. 15 is a diagram that illustrates a situation of use of the electronic apparatus in a second embodiment.

FIG. 15 is a diagram that illustrates an example of use of the electronic apparatus 1 in the second embodiment. In the second embodiment, the event site 100 is split into a first block 101 and a second block 102. The first block 101 is provided with booths A, B, C, and D, and the second block is provided with booths E, F, G, and H. In a case where a user goes around the plural booths provided in the first block 101 in a prescribed order, for example, in the order of the booth A, the booth B, the booth C, and the booth D, first information or a first application is provided from the server to the electronic apparatus 1. Further, in a case where the user goes around the plural booths provided in the second block in a prescribed order, for example, in the order of the booth E, the booth F, the booth G, and the booth H, second information or a second application is provided from the server to the electronic apparatus 1. The booths are provided with devices (for example, the NFC tags) A to H for identifying the respective booths.

Figure 16:
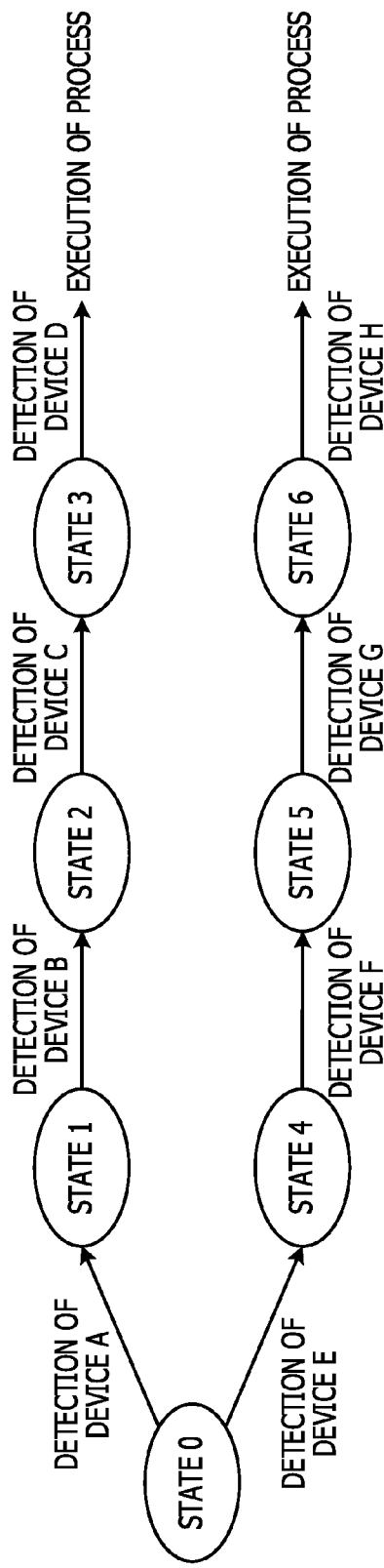
FIG. 16 is a state transition diagram in the second embodiment.

FIG. 16 is a state transition diagram of a case where the user visits the plural booths in an order in the second embodiment. The state transition diagram contains the state transition branch that indicates the state transition in a case where the user visits the plural booths contained in the first block 101 and the state transition branch that indicates the state transition in a case where the user visits the plural booths contained in the second block 102. In FIG. 16, the line of the state transition expressed by {"state 1", "state 2", "state 3"} will be referred to as a first state transition branch, and the line of the state transition expressed by {"state 4", "state 5", "state 6"} will be referred to as a second state transition branch. The two state transition branches branch from "state 0" as the origin. In "state 0", in a case where the user visits the booth A, that is, the sensor 40 of the electronic apparatus 1 detects the device A, the state transits to "state 1" as the first stage of the first state transition branch. In a case where the device E is detected, the state transits to "state 4" as the first stage of the second state transition branch. After the state transits to "state 1", in a case where the device B, the device C, and the device D are sequentially detected, the CPU 10 executes a process of a delivery request of the first information or the first application to the server. After the state transits to "state 4", in a case where the device F, the device G, and the device H are sequentially detected, the CPU 10 executes a process of a delivery request of the second information or the second application to the server. The order of the devices {device A, device B, device C, device D} provided by the first state transition branch will be referred to as a first order branch, and the order of the devices {device E, device F, device G, device H} provided by the second state transition branch will be referred to as a second order branch.

FIG. 17 is a diagram that illustrates the order data that are retained by the electronic apparatus 1. The order data contain first condition data to seventh condition data. The first condition data provide "state 0" as the source state of transition and two conditions of "detection of device A" and "detection of device E" as the conditions of the state transition. Further, the first condition data provide "state 1" as the destination state of transition in a case where the device A is detected and provide "state 4" as the destination state of transition in a case where the device E is detected. It is assumed that the data amount of the first condition data is 100 bytes. As described above, in a case where plural different transition conditions are provided for a single source state of transition and plural different destination states of transition that correspond to plural different transition conditions are provided, this indicates that the order provided by the order data has branches into plural order branches.

The second condition data provide "state 1" as the source state of transition, "detection of device B" as the condition of the state transition, and "state 2" as the destination state of transition. The data amount of the second condition data is 50 bytes. The second condition data are condition data in which "state 1" provided as one destination state of transition in the first condition data that provide branches is set as the source state of transition. Thus, the second condition data will be referred to as the first stage condition data of the first order branch.

The third condition data provide "state 2" as the source state of transition, "detection of device C" as the condition of the state transition, and "state 3" as the destination state of transition. The data amount of the third condition data is 50 bytes. The fourth condition data provide "state 3" as the source state of transition, "detection of device D" as the condition of the state transition, and "delivery request to server" as the content of the process. In the fourth condition data, the destination state of transition is not defined. Thus, the fourth condition data will be referred to as the final stage condition data of the first order branch. The data amount of the fourth condition data is 50 bytes. Similarly to the second condition data to the fourth condition data, each of the fifth condition data to the seventh condition data provides the source state of transition, the condition of the state transition, the destination state of transition, and the content of the process as the condition data of the second order branch. "Transition probability" indicated in FIG. 17 indicates the transition probabilities to two different states that are provided as the destination states of transition in the first condition data. In this embodiment, the transition probability indicates the probability that the user who visits the event site 100 visits the booth A or the booth E among the booth A of the first block 101 and the booth E of the second block. Here, the transition probabilities indicate that the probability that the user visits the booth A and the state transits to "state 1" is 0.8 (80%) and the probability that the user visits the booth E and the state moves to "state 4" is 0.2 (20%). Those transition probabilities are in advance provided based on statistics about visitors of the event site 100, degrees of popularity of the blocks 101 and 102, and so forth, for example.

The second embodiment suggests a solution for performing preferential extraction of the condition data related to which order branch among plural order branches, which are caused by branching, in a case where all of the data of the order data may not be retained by the memory 31.

Figure 18:
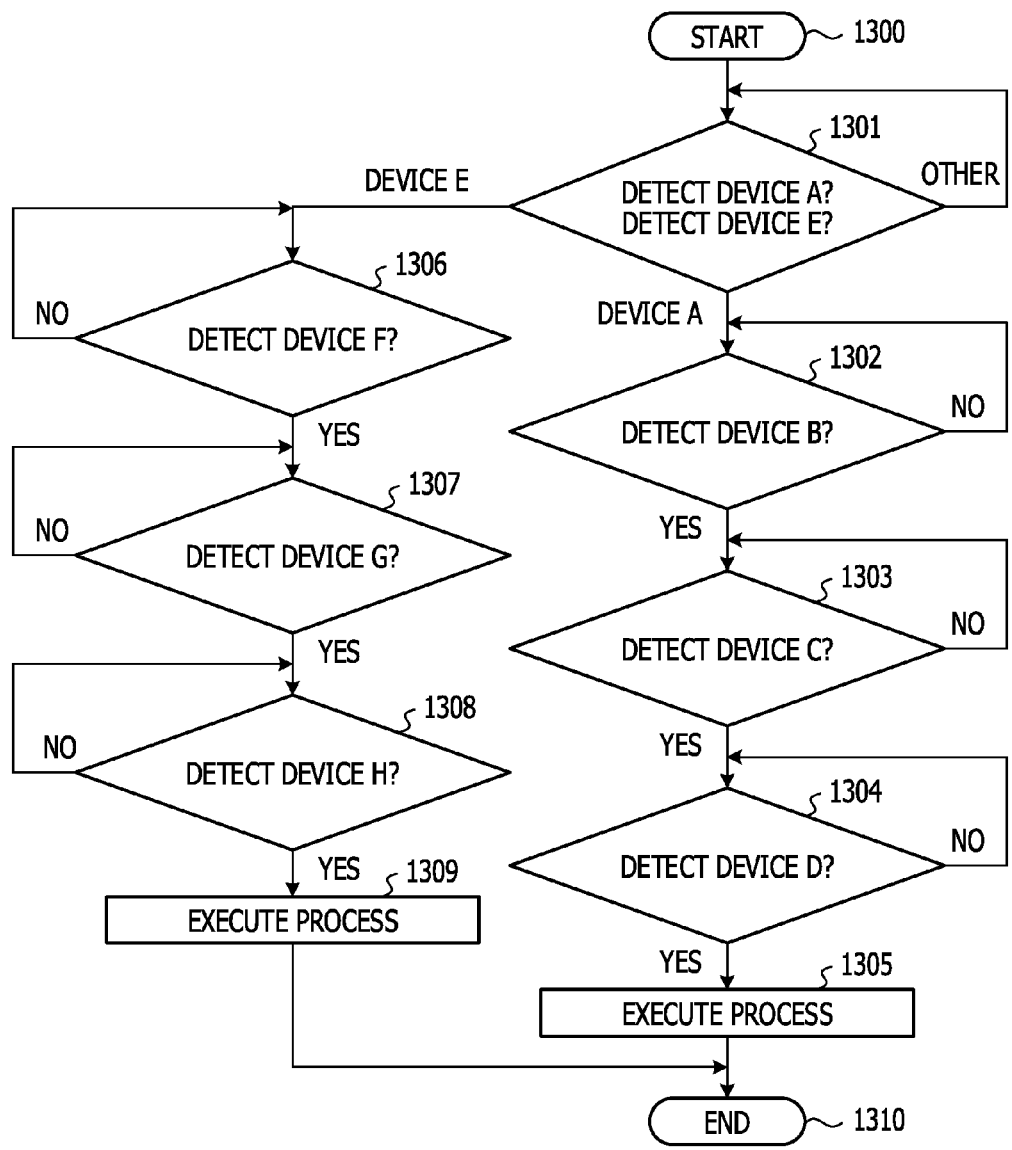
FIG. 18 is a process flowchart of the electronic apparatus in the second embodiment.

FIG. 18 is a flowchart of processes that the electronic apparatus 1 performs based on the order data illustrated in FIG. 17. A process flow is started by process 1300. In process 1301, the electronic apparatus 1 determines whether the sensor 40 detects the device A, the device E, or neither of the devices A and E. In a case where neither of the devices A and E is detected, the electronic apparatus 1 repeats process 1301. In a case where the device A is detected, the process progresses to process 1302. In a case where the device E is detected, the process progresses to process 1306. In process 1302, the electronic apparatus 1 determines whether or not the sensor 40 detects the device B. In a case where the device B is not detected, the electronic apparatus 1 repeats process 1302. In a case where the device B is detected, the process moves to process 1303. In process 1303, the electronic apparatus 1 determines whether or not the sensor 40 detects the device C. In a case where the device C is not detected, the electronic apparatus 1 repeats process 1303. In a case where the device C is detected, the process moves to process 1304. In process 1304, the electronic apparatus 1 determines whether or not the sensor 40 detects the device D. In a case where the device D is not detected, the electronic apparatus 1 repeats process 1304. In a case where the device D is detected, the process moves to process 1305. In process 1305, the electronic apparatus 1 executes a process, here, executes the delivery request of the first information or the first application to the server, and the process is finished in process 1310. Further, in a case where the device E is detected in process 1301, the electronic apparatus 1 determines whether or not the device F, the device G, and the device H are sequentially detected in processes 1306 to 1308. The process is finished in process 1310 via process 1309.

Figure 19:
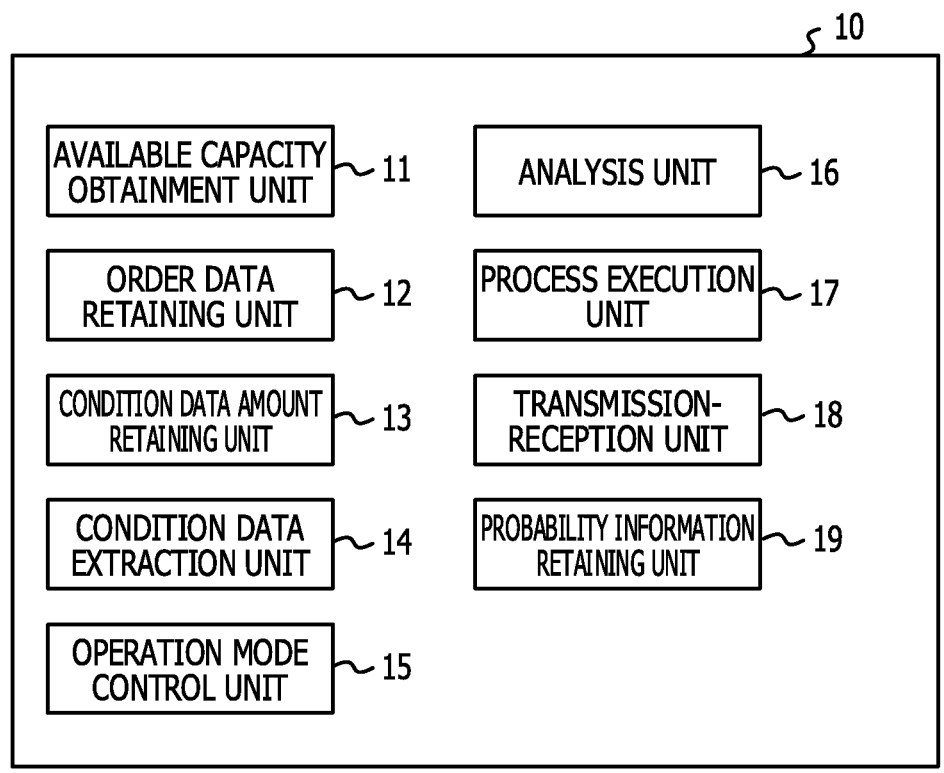
FIG. 19 is a function block diagram of the CPU in the second embodiment.

FIG. 19 is a function block diagram of the CPU 10 in the second embodiment. The same reference numerals are provided to the same function blocks as the function blocks illustrated in FIG. 9, and a description thereof will not be made. The CPU 10 executes prescribed computer programs that are stored in the non-volatile memory 65 or the like and thereby functions as a probability information retaining unit 19 in addition to the function blocks illustrated in FIG. 9. The probability information retaining unit 19 retains transition probabilities to the state transition branches caused by branching in a case where the order data contain condition data that provide branching conditions.

Figure 20:
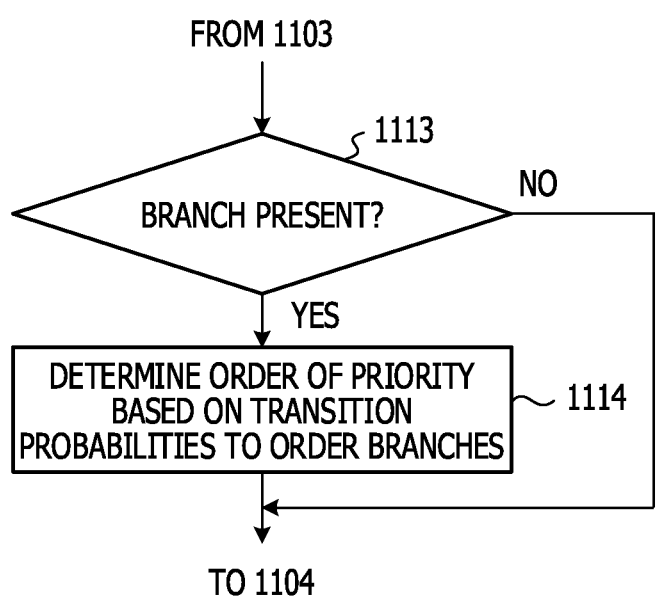
FIG. 20 is a process flowchart of the CPU in the second embodiment.

FIG. 20 is a flowchart of processes executed by the CPU 10. After process 1103 illustrated in FIG. 11, in process 1113, the condition data extraction unit 14 determines whether or not any of the condition data contained in the order data contain the branching condition. In a case where the branching condition is contained, the process progresses to process 1114. In a case where the branching condition is not contained, the process progresses to process 1104. In process 1114, the condition data extraction unit 14 decides the order of priority of the branches based on the transition probabilities to the state transition branches retained in the probability information retaining unit 19. Thereafter, in process 1104, the condition data extraction unit 14 extracts the condition data along the decided order of priority.

FIGS. 21A, 21B, and 21C are diagrams that explain an extraction method of condition data in the second embodiment. The CPU 10 first retains the order data illustrated in FIG. 17 in the order data retaining unit 12. As illustrated in FIG. 17, the total data amount of the plural condition data contained in the order data is 400 bytes. Here, if the available capacity of the memory 31 of the MCU 30 is 180 bytes, all of the condition data contained in the order data may not be written in the memory 31. Thus, the condition data extraction unit 14 extracts the condition data. The condition data extraction unit 14 first extracts the first condition data that are the first stage condition data in the order data. The data amount of the first condition data is 100 bytes and is smaller than the available capacity of the memory 31. Thus, the condition data extraction unit 14 fixes the first condition data as the condition data to be notified to the MCU 30. This situation is illustrated in FIG. 21A. Because the probability (80%) of the transition from "state 0" to "state 1" is higher than the probability (20%) of the transition from "state 0" to "state 4", the condition data extraction unit 14 next extracts the second condition data that provide "state 1" as the source state of transition as the condition data to be notified to the MCU 30. The data amount of the second condition data is 50 bytes. The total data amount of the first condition data and the second condition data is 150 bytes and is smaller than 180 bytes of the available capacity of the memory 31. Thus, the condition data extraction unit 14 fixes the second condition data as the condition data to be notified to the MCU 30. This situation is illustrated in FIG. 21B. The condition data extraction unit 14 next extracts the condition data that provide "state 2" as the source state of transition, that is, the third condition data, based on the fact that the destination state of transition of the second condition data is "state 2". The data amount of the third condition data is 50 bytes. The total data amount of the first condition data, the second condition data, and the third condition data is 200 bytes and is larger than 180 bytes of the available capacity of the memory 31. Thus, the condition data extraction unit 14 determines that the third condition data may not be contained in the condition data to be notified to the MCU 30. As a result, the condition data extraction unit 14 decides the first condition data and the second condition data as the condition data to be notified to the MCU 30. The condition data extraction unit 14 further deletes the state provided as the destination state of transition for the condition data, which provide the state that is not provided as the source state of transition of the other extracted condition data as the destination state of transition, among the extracted condition data and provides a notification to the CPU as the content of the process. That is, the condition data extraction unit 14 deletes "state 4" that is provided as the destination state of transition in a case where the device E is detected in the contents of the extracted first condition data and performs a correction so that "notify to CPU" is indicated as the content of the process. Similarly, the condition data extraction unit 14 deletes "state 2" that is provided as the destination state of transition in the contents of the extracted second condition data and performs a correction so that "notify to CPU" is indicated as the content of the process. This situation is illustrated in FIG. 21C. The extracted and corrected condition data are notified to the MCU 30. Accordingly, the MCU 30 continues the order determination in a case where the device A is detected in "state 0". A notification is performed from the MCU 30 to the CPU 10 in a case where the device E is detected in "state 0" and a case where the device B is detected in "state 1".

As described above, in a case where the order provided by the order data contains plural order branches caused by branching and all data of the order data may not be stored in the available capacity of the memory 31, the condition data about the order branches with the higher transition probabilities among the order branches are preferentially extracted. Accordingly, the probability that the CPU 10 maintains the quiescent mode after the CPU 10 instructs the MCU 30 about the extracted condition data, that is, the probability that the power consumption of the CPU 10 may be reduced may be increased.

In FIGS. 21A, 21B, and 21C, a description is made about an example where the available capacity of the memory 31 is 180 bytes. However, for example, if the available capacity of the memory 31 is 300 bytes, the total data amount of the condition data that additionally contain the third condition data and the fourth condition data is 250 bytes and is smaller than the available capacity of the memory 31. In this case, because all the condition data about the first order branch is extracted, the condition data of the second order branch, which are not extracted due to the low transition probability, may further be extracted sequentially. Accordingly, the MCU 30 may execute a condition determination even in a case where the device E is detected in "state 0" and the state transits to the second order branch, and the power consumption of the CPU 10 may thereby be reduced.

Figure 22:
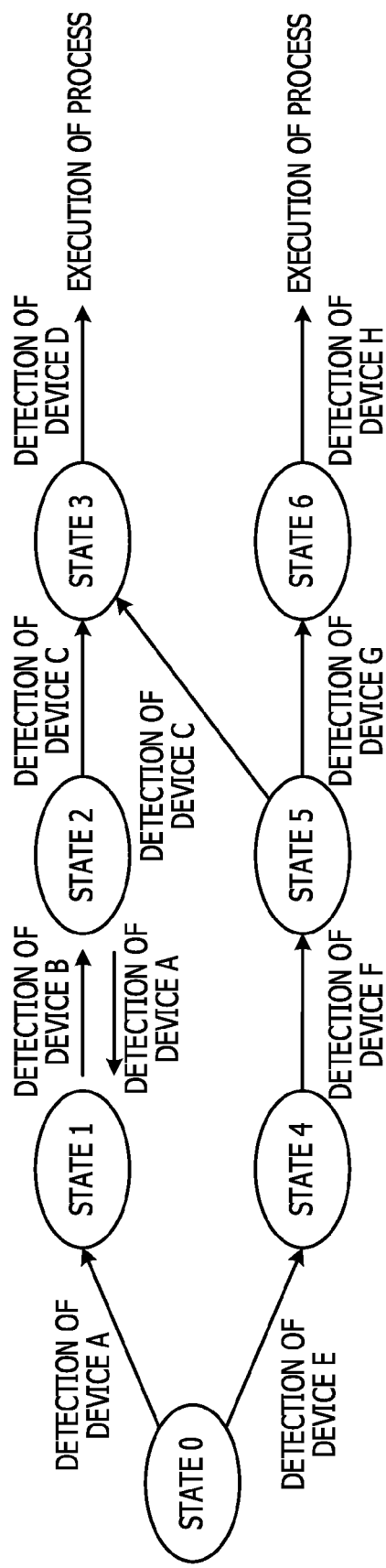
FIG. 22 is another state transition diagram in the second embodiment.

FIG. 22 is a diagram that illustrates a modification example of the state transition diagram in the second embodiment. In the example of FIG. 22, the state again returns to "state 1" in a case where the device A is detected after the state transits from "state 1" to "state 2". As described above, a state transition may include not only cases where the state regularly transits only in one direction but also cases where bidirectional transitions are repeated. Further, in "state 5", the state transits to "state 6" in a case where the device G is detected and transits to "state 3" in a case where the device C is detected. As indicated by this example, there are cases where branching again occurs in the state transition branch that has once branched and cases where a certain state transition branch merges into another state transition branch. In such a case, the MCU 30 not only notifies the CPU 10 that the device D is detected in "state 3"

but may also notify the CPU 10 of information that the state transition reaches "state 3" through "state 0", "state 1", and "state 2" or that the state transition reaches "state 3" through "state 0", "state 4", and "state 5". Accordingly, the CPU 10 may execute a different process depending on which states the state transition goes through.

In the above, the first embodiment and the second embodiment have been disclosed. Several modification examples will further be described.

In the second embodiment, a description is made that the probability information retaining unit 19 retains predetermined transition probabilities. However, as the transition probabilities, values may be used that the CPU 10 or the MCU 30 dynamically calculates in the electronic apparatus 1 based on records of the devices detected in the past. Accordingly, the electronic apparatus 1 is customized while reflecting the behavioral pattern of the user who is the owner of the electronic apparatus 1, and the power consumption of the CPU 10 may thereby be further reduced. In this case, the MCU 30 statistically preserves detection results of the devices. For example, in the example illustrated in FIG. 16, the MCU 30 counts and retains frequency X of detection of the device A and frequency Y of detection of the device E in "state 0", thereby calculates the transition probabilities, and transmit those to the CPU 10. Alternatively, the MCU 30 may count frequency X of detection of the device A and frequency Y of detection of the device E in "state 0" and transmit the frequencies to the CPU 10, and the CPU 10 may calculate the transition probabilities. When the MCU 30 performs a notification to the CPU 10 based on a determination result of the condition data, the MCU 30 may notify the CPU 10 of the transition probabilities or detection count values of the devices in addition to the determination result. Accordingly, an increase in the frequency of turning of the CPU 10 into the active mode may be reduced.

Further alternatively, the server may collect device detection information from the electronic apparatuses 1 of plural visitors who visit the event site 100, the general tendency may be evaluated and the transition probabilities may be calculated at the server, and probability information may thereby be delivered to the electronic apparatuses 1. This method enables appropriate transition probabilities to be given to the electronic apparatuses 1 of the users who visit the event site 100 for the first time, for example.

Further, in the second embodiment, a description is made about a method of selecting the state transition branch based on the transition probabilities to the state transition branches in a case where the state transition diagram has plural state transition branches. As another method of selecting the state transition branch, a method of selecting the state transition branch to which the state has most recently transited may be used. In a case where the user repeats the same behavior, the accuracy rate for the branch selection may be improved by using this method, and the power consumption of the CPU 10 may thereby be reduced.

Further, in the second embodiment, a description is made about an example where one state transition branch is selected in a case where the state transition diagram has plural state transition branches and the condition data of the other state transition branch is additionally extracted in a case where all the condition data of the selected state transition branch may be stored in the memory 31. In another extraction method of condition data, first stage condition data of the respective state transition branches may be first extracted. In a case where the available capacity is still present, next stage condition data and further next condition data of the respective state transition branches may sequentially be extracted. Accordingly, even in a case where behavior of the user may not be predicted, the CPU 10 may be controlled in the quiescent mode for a certain period.

Further, in the first embodiment and the second embodiment, a description is made about a method in which the MCU 30 is arranged in the electronic apparatus 1 separately from the sensor 40 and the MCU 30 determines the detection order of the plural devices. However, as another modification example, a configuration may be employed in which the function of the MCU 30 is incorporated in an internal portion of the sensor 40 and the MCU 30 is omitted. In this case, the CPU 10 instructs the sensor 40 about the order data, and the sensor 40 itself performs the condition determination and performs a notification to the CPU 10 in a case where the devices are detected in a prescribed order.

Further, in the first embodiment and the second embodiment, details are described about a case where the sensor 40 detects the devices and notifies the MCU 30 of which device is detected. However, as another modification example, the detection of the devices may be performed by cooperative processing of the MCU 30 and the sensor 40. For example, the sensor 40 may convert radio wave signals received from the devices into analog electric signals and transmit those to the MCU 30. The MCU 30 may perform prescribed data processing based on the electric signals and thereby recognize which device is detected. In this case, the device detection signals are generated in an internal portion of the MCU 30. In this case also, a determination about a device detection order is executed in the internal portion of the MCU 30 based on the condition data notified from the CPU 10 to the MCU 30.

Further, as another modification example, the available capacity calculation unit 32 of the MCU 30 may calculate the capacity that is usable for retaining the condition data in the available capacity of the memory 31 and notify the available capacity obtainment unit 11 of the CPU 10 of the usable capacity. The memory 31 is used as a data retaining unit in data processing executed by the MCU 30 other than for retaining the condition data. Thus, there may be a case where all of the available capacity may not be used for retaining the condition data. In such a case, the value obtained by multiplying the value of the available capacity by a certain ratio is notified to the CPU 10 as the available capacity that is usable for retaining the condition data.

Further, in a case where the CPU 10 provides plural order data, there may be a case where each of plural applications provides order data and the MCU 30 is desired to execute plural order determinations in parallel, for example. In such a case, for example, in a case where the MCU 30 is caused to execute three order determinations, the condition data extraction unit 14 of the CPU 10 may extract the condition data of the respective order data by using the value obtained by dividing the available capacity retained in the available capacity obtainment unit 11 by "3".

Further, as another modification example, a deletion method of data stored in the memory 31 will be described. In FIGS. 11 and 12, a description is made about the procedures in which the MCU 30 deletes the condition data stored in the memory 31 based on a data deletion instruction from the CPU 10. However, the MCU 30 may perform a notification to the CPU 10 based on the condition determination and thereafter delete the condition data that provide the condition about which a determination is already made in accordance with a decision of the MCU 30 itself. Further, even before the notification to the CPU 10, the MCU 30 may delete the condition data that provide the condition about which a determination is already made and that the MCU 30 decides that deletion is appropriate. For example, in the state transition diagram illustrated in FIG. 16, it is assumed that all of the condition data about the first state transition branch, that is, the first condition data to the fourth condition data are stored in the memory 31. Here, at the point when the device A is detected and the state transits from "state 0" to "state 1", the MCU 30 deletes, from the memory 31, the first condition data that provide the condition of transition from "state 0" to "state 1" as undesired data. Similarly, the MCU 30 deletes, from the memory 31, the second condition data in a case where the device B is detected, the third condition data in a case where the device C is detected, and the fourth condition data in a case where the device D is detected. Accordingly, the available capacity of the memory 31 may be secured in an early stage.

As a still another example, in the state transition diagram illustrated in FIG. 16, it is assumed that at least a portion of the condition data about the second state transition branch, for example, the fifth condition data are stored in the memory 31 in addition to the first condition data to the fourth condition data that are the condition data about the first state transition branch. Here, at the point when the device A is detected and the state transits from "state 0" to "state 1", the MCU 30 deletes, from the memory 31, the fifth condition data about the second state transition branch in addition to the first condition data that provide the condition of transition from "state 0" to "state 1" as undesired data. On the other hand, at the point when the device E is detected and the state transits from "state 0" to "state 4", the MCU 30 deletes, from the memory 31, the first condition data to the fourth condition data about the first state transition branch in addition to the fifth condition data that provide the condition of transition from "state 0" to "state 4" as undesired data. Accordingly, the available capacity of the memory 31 may be secured in an early stage.

Further, in the first embodiment and the second embodiment, a description is made about a case where the sensor 40 detects the device and generates the device detection signal. However, the sensor 40 may detect a specific occurrence (event) and generate an event detection signal. For example, in a case where the electronic apparatus 1 is provided with a walking sensor as the sensor 40, the sensor 40 detects events such as "walking" and "stop" performed by the user carrying the electronic apparatus 1. An application is assumed that causes the electronic apparatus 1 to execute a vibration function to avoid leaving personal belongings behind in a case where the walking user once stops and thereafter starts walking again, for example. In this case, the MCU 30 performs the order determination of "walking detection signal", "stop detection signal", and "walking detection signal" that are plural event detection signals generated by the sensor 40 and notifies the CPU 10 of the order determination. As described above, the present disclosure may be applied to cases where the sensor 40 detects not only devices but also certain events. In this case, the term "device" in this specification is used as a term that includes both of the meanings of "device and event".

In the present disclosure, the sensor 40 may be provided with plural sensors, and the MCU 30 may thereby be caused to execute the order determination about plural device detection signals or event detection signals generated by the plural sensors. For example, the radio device for Bluetooth and the walking sensor as the sensors 40 are provided in the electronic apparatus 1. Then, in a case where the radio device for Bluetooth detects the Bluetooth beacon provided in a certain store and the walking sensor thereafter detects that the walking user stops, the electronic apparatus 1 performs a delivery request of store information of the store to the server. The present disclosure is applicable to such an electronic apparatus 1.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
a memory;
a first processor; and
a second processor,
wherein
the first processor is configured to
retain first order data that indicate a first order of a first plurality of devices including a first device and a second device, the first order data indicating that the first device is positioned at a lead position of the first order and the second device is positioned at an end position of the first order, the first order data having a first data size,
generate second order data, based on the first order data, that indicate a second order of a second plurality of devices, the second plurality of devices corresponding to a first part of the first plurality of devices and being arranged sequentially in the first order, the second plurality of devices including the first device and not including the second device, the second order data having a second data size smaller that the first data size, and
decrease power consumption of the first processor after the second order data is generated,
the memory is configured to
retain the second order data,
the second processor is configured to
recognize detecting of the second plurality of devices,
determine whether a first detection order of the second plurality of devices corresponds with the second order indicated by the second order data retained in the memory, and
output a first correspondence signal when the first detection order corresponds with the second order, and
the first processor is configured to
increase the power consumption of the first processor based on the first correspondence signal,
generate, based on the first order data, third order data that indicate a third order of a third plurality of devices, the third plurality of devices corresponding to a second part of the first plurality of devices and being arranged sequentially next to the second plurality of devices in the first order, the third order data having a third data size smaller that the first data size, and
decrease power consumption of the first processor after the third order data is generated, the memory is configured to
retain the third order data,
the second processor is configured to
recognize detecting of the third plurality of devices,
determine whether a second detection order of the third plurality of devices corresponds with the third order indicated by the third order data retained in the memory, and
output a second correspondence signal when the second detection order corresponds with the third order, and
the first processor is configured to
increase the power consumption of the first processor based on the second correspondence signal.

2. The apparatus according to claim 1, wherein the first processor is configured to generate the second order data based on an available capacity of the memory.

3. The apparatus according to claim 2, wherein the first processor is configured to compare the available capacity of the memory with the first data size of the first order data and identify the second order that is provided by the second order data so that the second data size of the second order data becomes smaller than the available capacity the first data size of the first order data is larger than the available capacity.

4. The apparatus according to claim 1, wherein power that is consumed when the second processor performs the determination is lower than power that the first processor uses to perform the determination.

5. The apparatus according to claim 1, wherein the second processor is configured to delete the second order data from the memory before the memory retains the third order data.

6. The apparatus according to claim 1, wherein the first processor is a central processing unit, the second processor is a micro-control unit, and the memory is a static random access memory that is included in the micro-control unit.

7. The apparatus according to claim 1, wherein the first processor is configured to cause the memory to more preferentially retain a fourth order data that provide a first order branch than a fifth order data that provide a second order branch when the first order includes the first order branch and the second order branch and a first probability that a second device which is provided as a lead position of the first order branch is detected is higher than a second probability that a third device which is provided as a lead position of the second order branch is detected.

8. The apparatus according to claim 7, wherein the first processor is configured to cause the memory to retain data that provide the third device which is provided as at least the lead position of the second order branch when all the fourth order data are retained in the memory and the memory is allowed to retain at least a portion of the fifth order data.

9. The apparatus according to claim 8, wherein the first processor is configured to delete the fourth order data that are stored in the memory when the third device is detected earlier than the second device.

10. The apparatus according to claim 7, wherein the first processor is configured to calculate the first probability and the second probability based on a detection history of the plural devices that are detected.

11. The apparatus according to claim 7, wherein the second processor is configured to notify the first processor of the available capacity.

12. The apparatus according to claim 1, wherein the first processor is configured to execute a first application or perform a delivery demand for a second application to an information processing apparatus when the first detection order of the second plurality of devices correspond with the first order.

13. The apparatus according to claim 1, wherein the first processor is configured to turn into a first operation mode after the second order data are extracted and turn from the first mode into a second mode with higher power consumption than the first mode based on the first correspondence signal.

14. A device detection method that uses an electronic apparatus which includes a first processor, a second processor, and a memory, the device detection method comprising:
retaining, by the first processor, a first order data indicating a first order of a first plurality of devices including a first device and a second device, the first order data indicating that the first device is positioned at a lead position of the first order and the second device is positioned at an end position of the first order, the first order data having a first data size;
generating, by the first processor, based on the first order data, second order data indicating a second order of a second plurality of devices, the second plurality of devices corresponding to a first part of the first plurality of devices and being arranged sequentially in the first order, the second plurality of devices including the first device and not including the second device, the second order data having a second data size smaller that the first data size;
decreasing, by the first processor, power consumption of the first processor after the second order data are generated;
retaining the second order data by the memory;
recognizing, by the second processor, detecting of the second plurality of devices;
determining, by the second processor, whether a first detection order of the second plurality of devices corresponds with the second order indicated by the second order data retained in the memory;
outputting, by the second processor, a first correspondence signal when the first detection order corresponds with the second order;
increasing, by the first processor, the power consumption of the first processor based on the first correspondence signal;
generating, by the first processor, based on the first order data, third order data that indicate a third order of a third plurality of devices, the third plurality of devices corresponding to a second part of the first plurality of devices and being arranged sequentially next to the second plurality of devices in the first order, the third order data having a third data size smaller that the first data size; and
decreasing, by the first processor, power consumption of the first processor after the third order data is generated;
retaining, by the memory, the third order data;
recognizing, by the second processor, detecting of the third plurality of devices;
determining, by the second processor, whether a second detection order of the third plurality of devices corresponds with the third order indicated by the third order data retained in the memory;
outputting, by the second processor, a second correspondence signal when the second detection order corresponds with the third order; and
increasing, by the first processor, the power consumption of the first processor based on the second correspondence signal.

15. The method according to claim 14, wherein the second order data is generated based on an available capacity of the memory.

16. The method according to claim 15, wherein the first processor is configured to compare the available capacity of the memory with the first data size of the first order data and identify the second order that is provided by the second order data so that the second data size of the second order data becomes smaller than the available capacity when the first data size of the first order data is larger than the available capacity.

17. The method according to claim 14, wherein power that is consumed when the second processor performs the determination is lower than power that the first processor uses to perform the determination.

18. The method according to claim 14, further comprising deleting the second order data from the memory before the memory retains the third order data.

\* \* \* \* \*